United States Patent
Majumdar

(10) Patent No.: US 10,372,724 B2
(45) Date of Patent: Aug. 6, 2019

(54) RELATIVISTIC CONCEPT MEASURING SYSTEM FOR DATA CLUSTERING

(71) Applicant: Kyndi Inc., Vienna, VA (US)

(72) Inventor: Arun Majumdar, Alexandria, VA (US)

(73) Assignee: Kyndi Inc., Vienna, VA (US)

( * ) Notice: Subject to any disclaimer, the term of this patent is extended or adjusted under 35 U.S.C. 154(b) by 526 days.

(21) Appl. No.: 14/040,197

(22) Filed: Sep. 27, 2013

(65) Prior Publication Data

US 2014/0032580 A1     Jan. 30, 2014

Related U.S. Application Data

(63) Continuation of application No. 13/418,021, filed on Mar. 12, 2012, now Pat. No. 8,566,321.

(Continued)

(51) Int. Cl.
*G06F 16/25*     (2019.01)
*G06F 16/35*     (2019.01)
*G06F 16/36*     (2019.01)

(52) U.S. Cl.
CPC .......... *G06F 16/258* (2019.01); *G06F 16/355* (2019.01); *G06F 16/367* (2019.01)

(58) Field of Classification Search
CPC ......... G06F 17/30707; G06F 17/30011; G06F 17/30598; G06F 17/30705; G06F 17/30569; G06F 17/30734; G06F 16/258; G06F 16/285; G06F 16/35; G06F 16/353; G06F 16/355; G06F 16/367; G06F 16/93; G06F 16/1794
See application file for complete search history.

(56) References Cited

U.S. PATENT DOCUMENTS 6,289,354 B1 *   9/2001   Aggarwal et al.
7,225,183 B2     5/2007   Gardner
(Continued)

OTHER PUBLICATIONS

Castelvecchi, Quantum computers ready to leap out of the lab, Jan. 5, 2017 [retrieved from Internet on Apr. 15, 2018], News in Focus, Springer Nature, vol. 541, pp. 9-10.*

(Continued)

*Primary Examiner* — James E Richardson
(74) *Attorney, Agent, or Firm* — Oblon, McClelland, Maier & Neustadt, L.L.P.

(57) ABSTRACT

A method and apparatus for mapping concepts and attributes to distance fields via rvachev-functions. The steps including generating, for a plurality of objects, equations representing boundaries of attributes for each respective object, converting, for a plurality of objects, the equations into greater than or equal to zero type inequalities, generating, for a plurality of objects, a logical expression combining regions of space defined by the inequalities into a semantic entity, and substituting, for a plurality of objects, the logical expression with a corresponding rvachev-function such that the resulting rvachev-function is equal to 0 on a boundary of the semantic entity, greater then 0 inside a region of the semantic entity, and less then 0 outside the region of the semantic entity. Also included is the step of generating a composite rvachev-function representing logical statements corresponding to the plurality of objects using the respective rvachev-functions of the objects.

16 Claims, 10 Drawing Sheets

Related U.S. Application Data

(60) Provisional application No. 61/451,932, filed on Mar. 11, 2011.

(56) References Cited

U.S. PATENT DOCUMENTS

| | | | |
|---|---|---|---|
| 2004/0247169 A1* | 12/2004 | Ross et al. | 382/137 |
| 2006/0074908 A1* | 4/2006 | Selvaraj et al. | 707/6 |
| 2007/0244843 A1 | 10/2007 | Bougaev et al. | |
| 2008/0005094 A1 | 1/2008 | Cunnane et al. | |
| 2008/0010259 A1 | 1/2008 | Feng et al. | |
| 2008/0010260 A1 | 1/2008 | Paulus et al. | |
| 2009/0164435 A1* | 6/2009 | Routt | 707/3 |
| 2011/0153627 A1 | 6/2011 | Rinneberg | |
| 2012/0054238 A1 | 3/2012 | Lee et al. | |

OTHER PUBLICATIONS

Kim, Google quantum computer test shows breakthrough is within reach, Sep. 28, 2017 [retrieved on Apr. 15, 2018], New Scientist, [retrieved from Internet] https://www.newscientist.com/article/2148989-google-quantum-computer-test-shows-breakthrough-is-within-reach/.*

Wang et al. Data Field for Hierarchical Clustering. International Journal of Data Warehousing and Mining. Dec. 2011. pp. 43-63. (Year: 2011).*

Telea et al. Simplified Representation of Vector Fields. 1999. In Proceedings of the conference on Visualization '99: celebrating ten years (VIS '99). IEEE Computer Society Press, Los Alamitos, CA, USA, 35-42 (Year: 1999).*

Garke et al. A phase field model for continuous clustering on vector fields. Sep. 2001. In IEEE Transactions on Visualization and Computer Graphics, vol. 7, No. 3, pp. 230-241 (Year: 2001).*

Peng et al. Mesh-Driven Vector Field Clustering and Visualization: An Image-Based Approach. Feb. 2012. IEEE transactions on visualization and computer graphics. vol. 18. No. 2 pp. 283-298. (Year: 2012).*

Heckel et al. Construction of vector field hierarchies. In Proceedings of the conference on Visualization '99: celebrating ten years (VIS '99). 1999. IEEE Computer Society Press, Los Alamitos, CA, USA, 19-25. (Year: 1999).*

Guan et al. A feature-emphasized clustering method for 2D vector field. Conference Proceedings—IEEE International Conference on Systems, Man and Cybernetics. 2014. 729-733. (Year: 2014).*

Jing et al. Ontology-based Distance Measure for Text Clustering, 2006. In Processing of the Text Mining Workshop, SIAM International Conference on Data Mining.

Zhang et al. Ontology-based clustering algorithm with feature weights. 2010. Journal of Computational Information Systems 6, No. 9 (2010): 2959-2966.

Poon et al. Unsupervised ontology induction from text. 2010. In Proceedings of the 48th Annual Meeting of the Association for Computational Linguistics (ACL'10). Association for Computational Linguistics, Stroudsburg, PA, USA, pp. 296-305.

Sabou. Visual Support for Ontology Learning: an Experience Report, 2005. In Proceedings. Ninth International Conference on Information Visualization. pp. 494-499.

Navas et al. Automatic generation of semantic fields for resource discovery in the semantic web. 2005. In Database and Expert Systems Applications, Springer Berlin Heidelberg, pp. 706-715.

Achtert et al. Detection and visualization of subspace cluster hierarchies. 2007. In Proceedings of the 12th International conference on Database Systems for advanced applications. (DASFAA'07), Ramamohanarao Kotagiri, P. Radha Krishna, Mukesh Mohania, and Ekawit Nantajeewarawat (Eds.). Springer-Verlag, Berlin, Heidelberg, pp. 152-163.

* cited by examiner

75

76

77

78

79

80

81

82

RELATIVISTIC CONCEPT MEASURING SYSTEM FOR DATA CLUSTERING

CROSS-REFERENCE TO RELATED APPLICATIONS

This application is a continuation application of, and claims the benefit of priority under 35 U.S.C. § 120 from, U.S. application Ser. No. 13/418,021, filed Mar. 12, 2012, herein incorporated by reference, which claims the benefit of priority from U.S. Provisional Application Ser. No. 61/451,932, filed Mar. 11, 2011.

BACKGROUND

Field of the Disclosure

The present embodiments define a means to compute using a numerical distance field that defines concepts with respect to attributes or description in order to provide a relativistic conceptual distance measurement system. This relativistic distance-field measurement between attribute or feature data to represent clusters that represent concepts is used to induce an ontology as a directed graph of a network of concepts by adding to each point of the distance field a vector-valued potential function. Methods of quantum computing processing are ideally suited in working with the present embodiments as all representations can be made in a Hilbert space for other operations based on the relativistic concept measuring system.

The relativistic conceptual distance measurement system is applied for data clustering and concept similarity measures and for reasoning using the distance field model in inducing an ontology from raw data about concepts. The present embodiments for the encoding of semantic information in numerical distance fields leads naturally to a field-structured representation of conceptual semantic knowledge where the discrete algebra describing the semantic entities is directly related to the continuous algebra of (vector) fields. The method maps the discreet definitional attributes from the ontology onto a continuous distance field in multidimensional space: this permits search functionality by simply writing search equations, as well as to use algorithms such as "beam sweep" to identify non-obvious though related concepts within a range of salience in a space of concept distance fields.

An ontology can be simply a list of sets concepts, arranged from left to right with the leftmost concept being the most General and the rightmost being the most specific concept. Every ontology has a Top and a Bottom. Therefore, a very simple ontology appears as: [Top, Transportation, Vehicle, Car, (Honda, Ford, BMW, Chevrolet), Bottom]

In this ontology, the set (Honda, Ford, BMW, Chevrolet) is the subset of "Car" and "Car" is a subset of Vehicle, which is a subset of Transportation. The Top level of an ontology subsumes everything (i.e. it is the set that contains every subset in the universe exclusive of itself). The Bottom is the set that contains no subset and being empty also contains itself.

Furthermore, any data may be clustered and ranked using the numerical distance computation of the present invention for associating semantic distances between data portioned as concepts using an ontology of metadata to provide similarity, search and reasoning processes.

Description of the Related Art

There is no related art in quantum computing literature for addressing how to represent concepts or ontologies in vector-valued or affine distance fields to provide a relativistic concept measurement system. In contrast, the system and method of the present embodiments can be used for reasoning or inducing ontologies from the distance-field representation. Superposition of multiple distance fields and representing relationships between different conceptual contexts is seamlessly handled by the present embodiments as is described below.

Ontologies provide the relationships between concepts and computing distance measures enable better concept clustering when processing data. Sometimes it is difficult to identify the ontology from raw data and other times it is hard to use ontologies to cluster or reason with data. For example, measures of semantic similarity based on WordNet (an ontology of the English language from Princeton) have been widely used in Natural Language Processing. The measures rely on the hierarchical structure of WordNet to produce a numeric score that represents how two concepts (represented by a sense or synset) are similar (or not). In their simplest form these measures use path length to identify concepts that are physically close to each other and therefore considered to be more similar than concepts that are further apart. All the measures in the literature generally rely to varying degrees on the idea of a least common subsumer (LCS); this is the most specific concept that is a shared ancestor of the two concepts. None of the measures are nonlinear and relativistic. For example, all the measurement approaches in the literature have measures from any concept in the hierarchy to the Top as being greater than and not equal to zero.

A good distance measure greatly improves clustering and data-mining processes, reduces false positives and false negatives. A good ontology provides precision, accuracy and coverage of data in the broadest to most specific and detailed levels in the form of a partitioning of the attributes and features or primitive concepts that compose other more complex or hierarchical concepts.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

The present embodiments include a method for mapping concepts and attributes to distance fields via rvachev-functions. Included in the method are the steps of generating, for each object of a plurality of objects, equations representing boundaries of attributes for each respective object, converting, for each object of a plurality of objects, the equations into greater than or equal to zero type inequalities, generating, for each object of a plurality of objects, a logical expression combining regions of space defined by the inequalities into a semantic entity, substituting, for each object of a plurality of objects, the logical expression with a corresponding rvachev-function such that the resulting rvachev-function is equal to 0 on a boundary of the semantic entity, greater then 0 inside a region of the semantic entity, and less then 0 outside the region of the semantic entity, and generating, a composite rvachev-function representing logical statements corresponding to the plurality of objects using the respective rvachev-functions of the objects.

Also described in the embodiments are a method of partitioning data into semantic regions as semantic distance fields and assigning rank to nodes within a network of linked of nodes in which concepts label the nodes and relations label the links and in which there is a common root ancestor for all nodes and relations derived from the distance field, such as, for example, all synonyms in a set that related within a specific class or category (i.e. a SYNSET). The ranking is calculated relativistically, based on a relative method of ranking of intermediate nodes or links. The method is useful in clustering data by assigning a distance using the rank derived from a pre-existing taxonomy or ontology or deriving a new taxonomy or ontology that characterizes the data and assigning weightings for reasoning or for search of results in response to similarly formed queries that are represented using the method.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
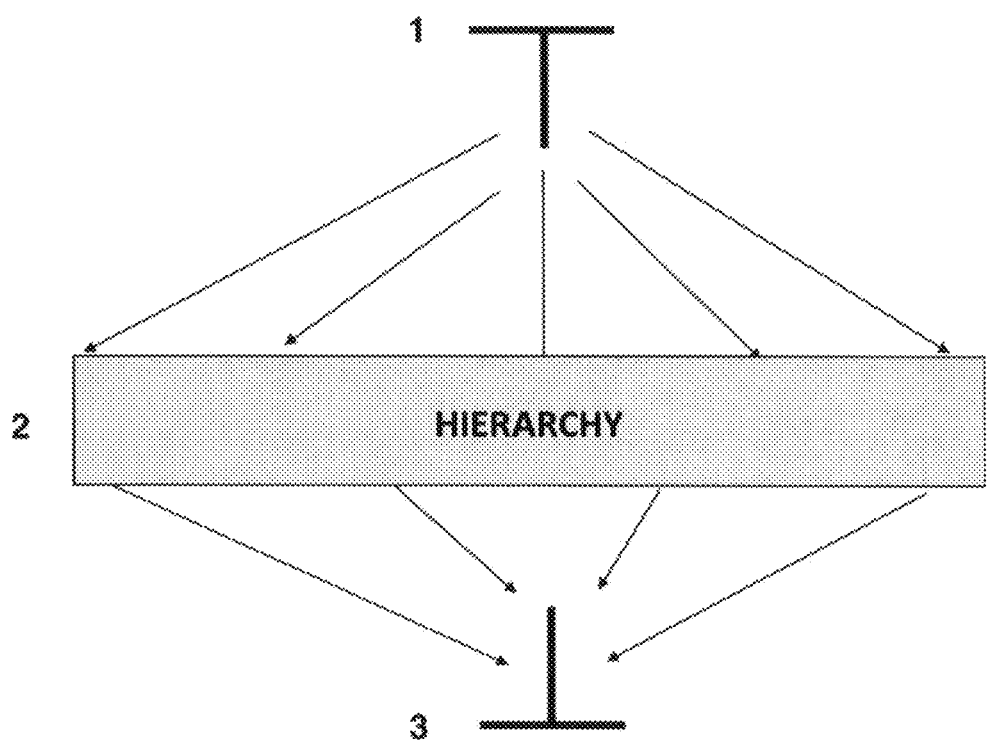
FIG. 1 illustrates relativistic semantic measures.

Referring now to the drawings, wherein like reference numerals designate identical or corresponding parts throughout the several views.

Thus, the foregoing discussion discloses and describes merely exemplary embodiments of the invention. As will be understood by those skilled in the art, the invention may be embodied in other specific forms without departing from the spirit or essential characteristics thereof. Accordingly, the disclosure of the invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

FIG. 1 shows the view of an ontology schematically with particular reference to the Top (the T symbol) 1 and the Bottom (the upside down T symbol) 2 to which the specific way of measuring distance is applied. The key idea is that the distance between concepts is relative and that the distance from any concept in the hierarchy to the common root, called the Top 1, is always zero with the constant constraint that the distance from the Top 1 (aka the set that contains everything) of the ontology to the Bottom 2 of the ontology (aka the absurd set) is defined as unity and that the distance from the Top 1 to any intermediate node is zero. Thus, semantic measures are normalized from the Top 1 to the Bottom 2 so that the maximum (i.e. absurdity) value is 1.0 and identity between concepts is 0.0.

Figure 2:
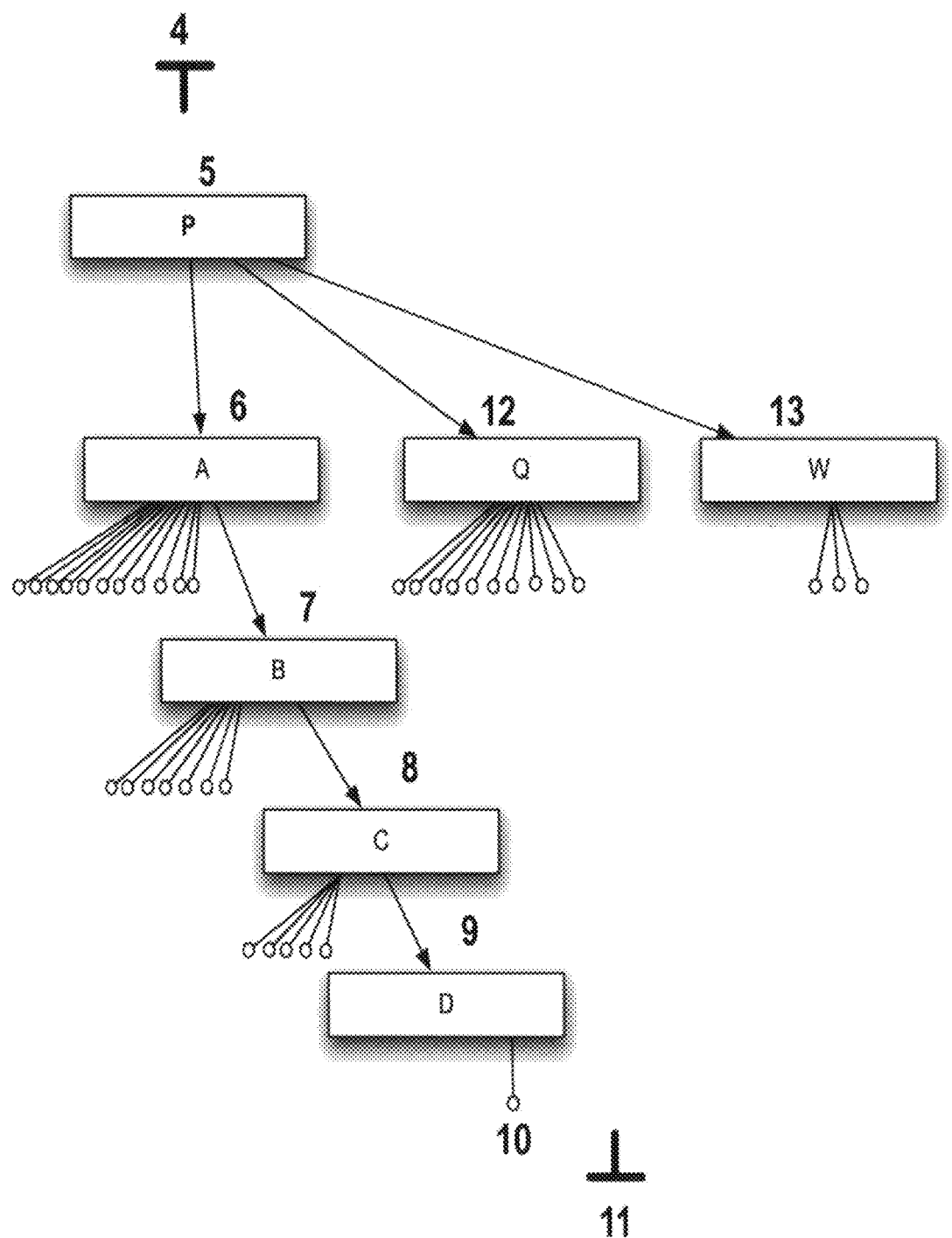
FIG. 2 illustrates the structure of a generic ontology.

FIG. 2 shows the generic structure of an ontology where there is a Top 1, with one or a plurality of parent concepts 5, and for each parent 5, a plurality of sibling concepts 6, 12 and 13. Each sibling, 6, 12, and 13 serves as a parent to its children concepts, 7, 8, 9, and 10. Finally, there is a Bottom, 11.

Figure 3:
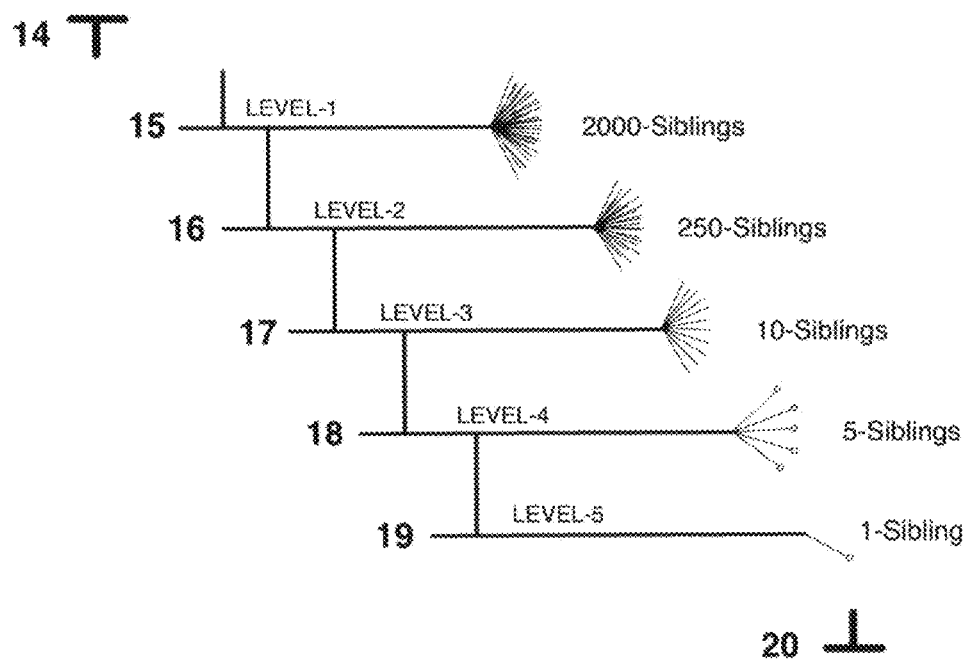
FIG. 3 illustrates the structure of the ontology in terms of levels and siblings.

FIG. 3 illustrates the view of counting the parents at each level, starting from the Top, 14. There is are levels, 15, 16, 17, 18, and 19 with respective numbers of siblings at each level of 2000-siblings, 250-siblings, 10-siblings, 5-siblings and 1-sibling respectively. Finally, there is a Bottom, 20.

Figure 4:
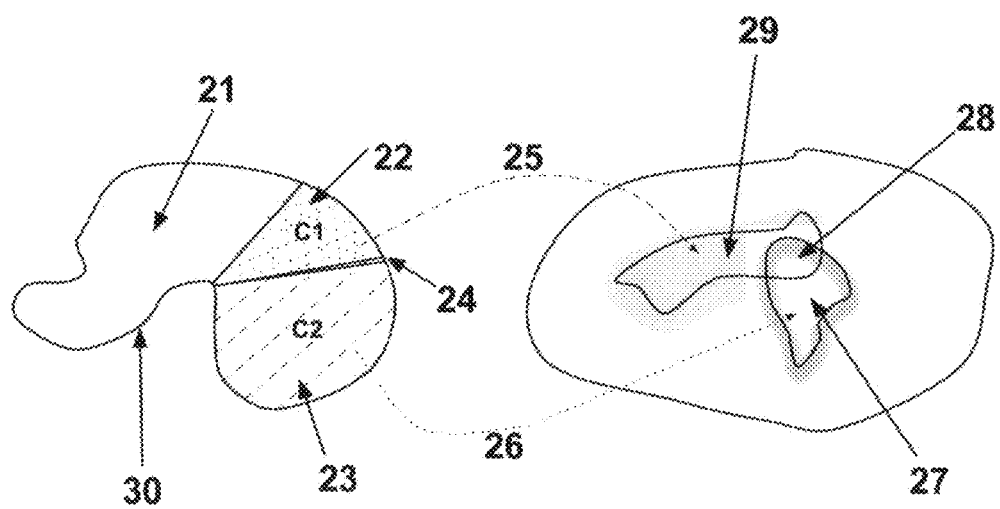
FIG. 4 illustrates mapping of concepts from conceptual regions to attribute regions.

FIG. 4 illustrates the mapping of concepts, represented by the topo-geometrical implicit distance fields, 21, 22 and 23 bounded by 30 with a boundary region, 24 between regions 22 and 23. There are mappings 25 and 26 that map to topo-geometrical distance fields, representing, but not limited to, attributes or features in 27 and 29 that share region 28.

Figure 5:
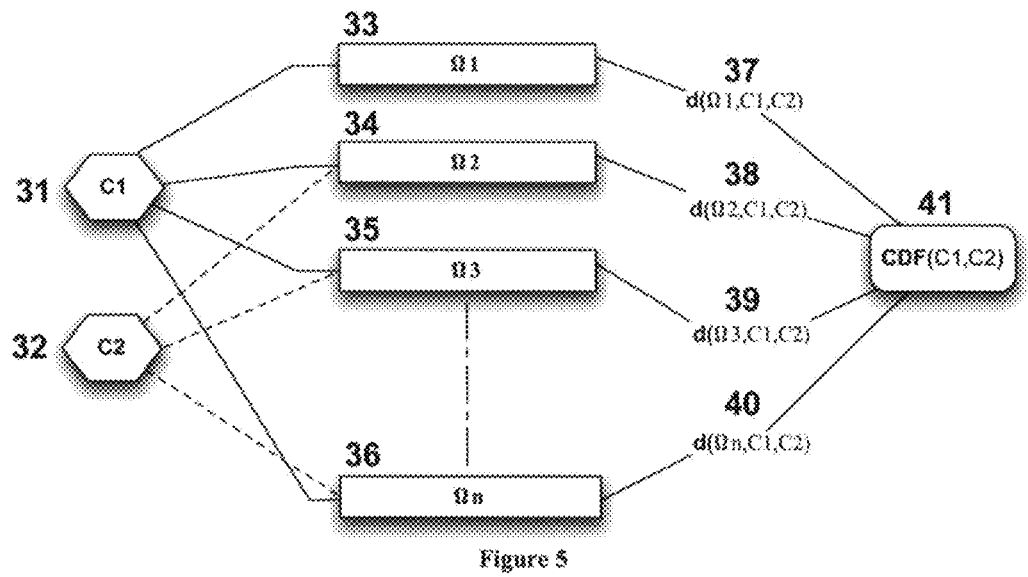
FIG. 5 illustrates mapping of concepts via composition of Rvachev-functions.

FIG. 5 illustrates composite representation of concepts C1 and C2, respectively 31 and 32 with 31 composed of topo-geometrical representations 33, 34, 35 and 36 whilst 32 is composed of 34, 35, and 36. Each of the representations, 33, 34, 35, 36 is re-described by a Rvachev-function, 37, 38, 39 and 40 respectively. The Rvachev-functions, 37, 38, 39 and 40 are composed into an output composite Rvachev-function, 41.

Figure 6:
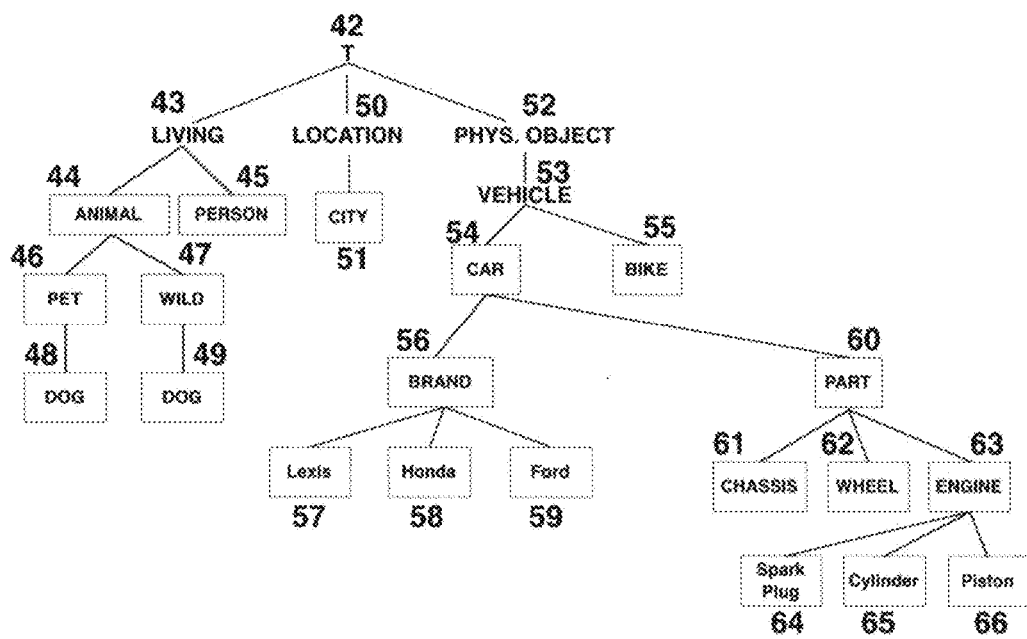
FIG. 6 illustrates an instance of a small ontology.

FIG. 6 is an example of a small ontology starting with a Top, 42 and parent concepts, 43, 50 and 52 respectively. Each parent has sibling concepts, 44, 45, 51 and 53 respectively and each sibling has child concepts. 43 has siblings 44 and 45, and 44 has children 46 and 47 with leaf concepts, 48 and 49. Concept at 50 has leaf 51. Concept 53 has siblings 54 and 55. Concept 54 has children 56 and 60. Concept 60 has siblings 61, 62 and 63. Concept 63 has leaves 64, 65, 66. The remaining concepts 57, 58 and 59 are children of concept 56 which is the sibling of 54. Concept 53 has leaf 55.

Figure 7:
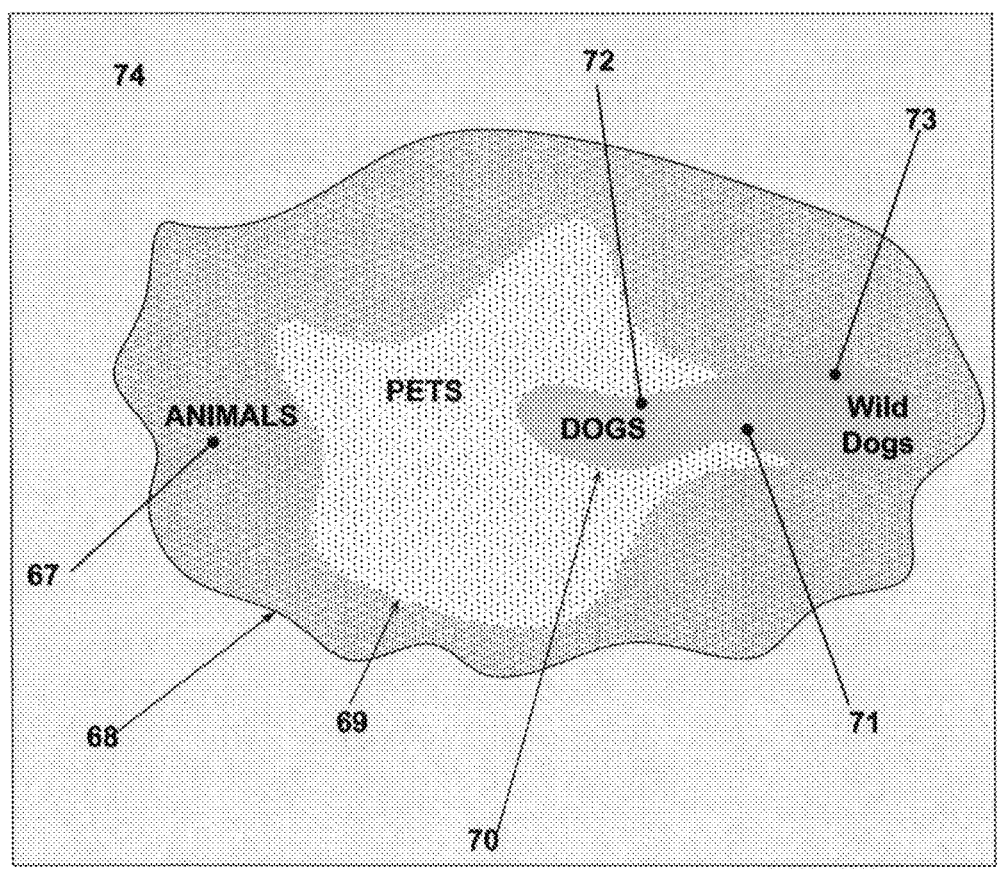
FIG. 7 illustrates concepts in terms of a semantic distance field.

FIG. 7 shows the projection of a part of an ontology from FIG. 6, as distance fields in a space 74. Concept 44 of FIG. 6, ANIMAL, corresponds to 67 of FIG. 7. There is a boundary 68 for 67. FIG. 6, 46 corresponds to the bounded region 69. FIG. 7, 72 corresponds to FIG. 6, 48 and FIG. 7, 73 corresponds to FIG. 6, 49. FIG. 6, 70 corresponds to 46 and 47 whilst 71 represents the region in which in FIGS. 6, 46 and 47 become separated.

Figure 8:
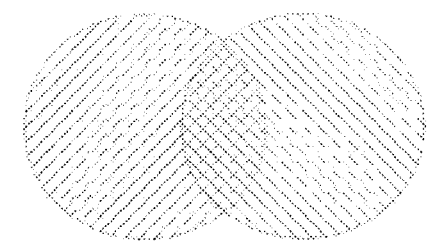
FIG. 8 illustrates the kinds of semantic distance field types and their logic.
Figure 8:
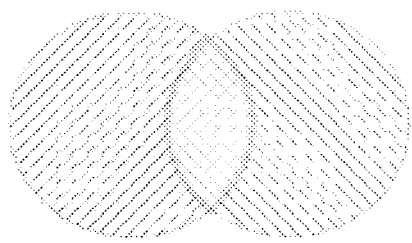
Figure 8:
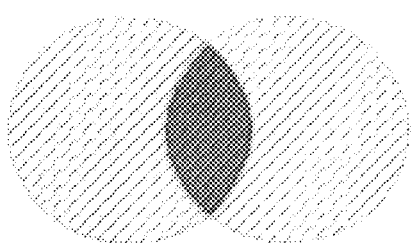
Figure 8:
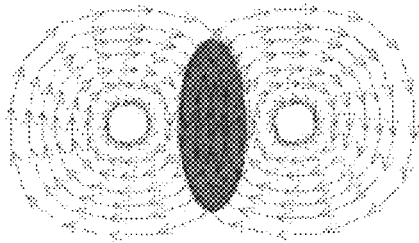
Figure 8:
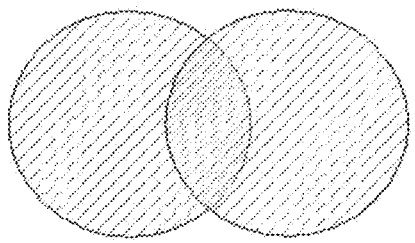
Figure 8:
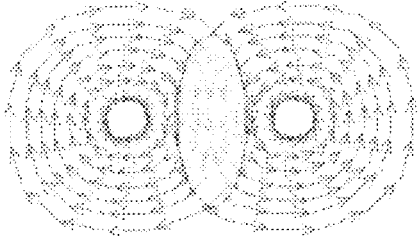
Figure 8:
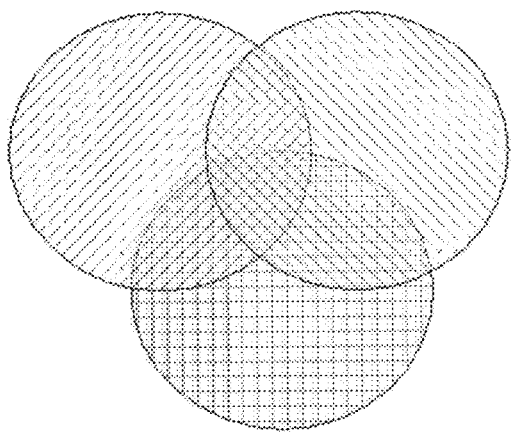
Figure 8:
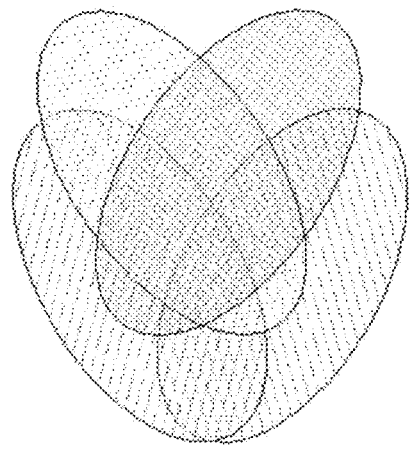

FIG. 8 represents different geometries and orientations of signed distance fields as a correspondence to Venn-Diagrams, 75 through 82.

Figure 9:
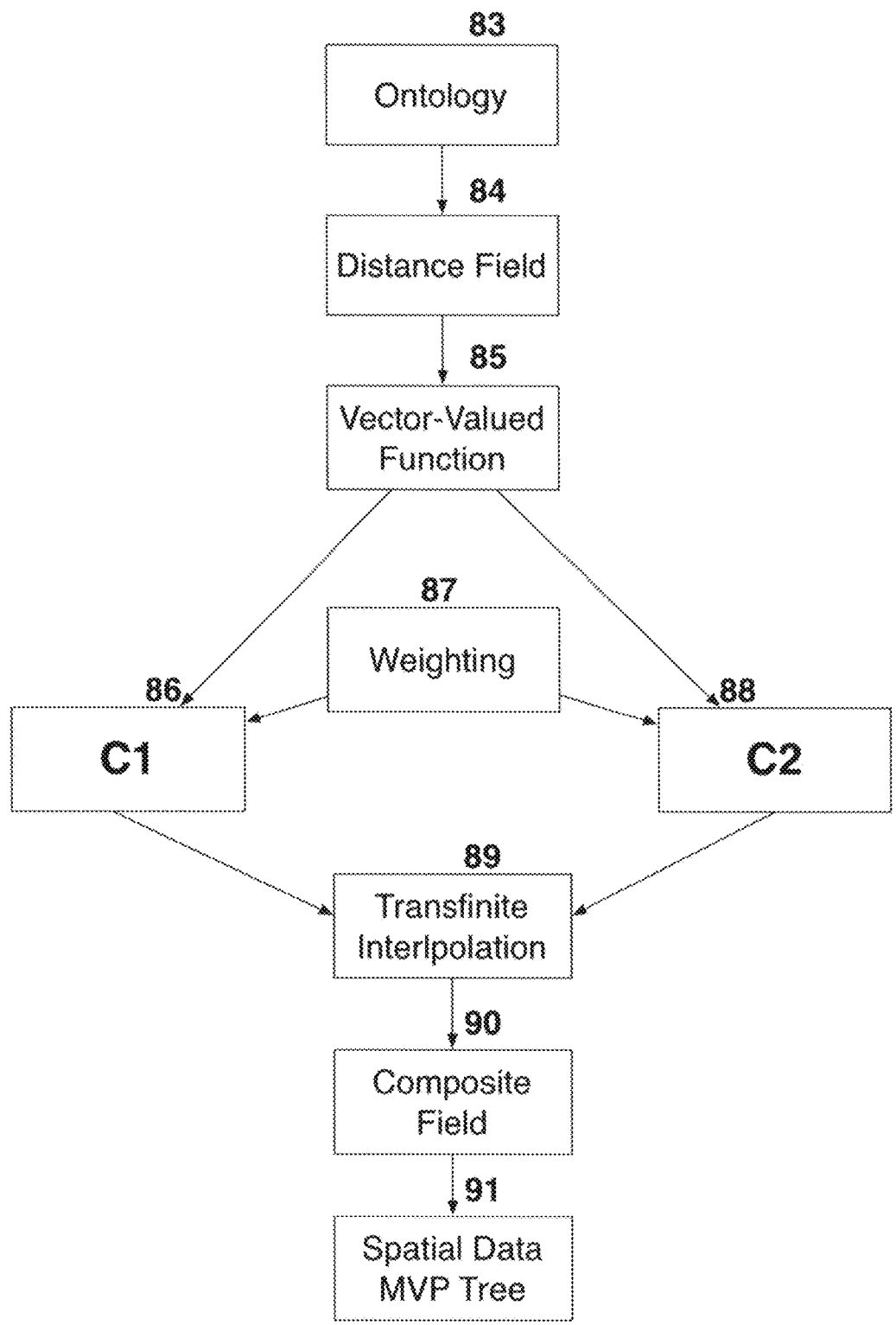
FIG. 9 illustrates flow chart for mapping concepts to a spatial data store.

FIG. 9 shows the general flow chart for combing concepts C1, 86, and C2, 88, into an relativistic distance representation, starting with an ontology 83, that is re-described as distance field, 84 to which is associated one or a plurality of vector valued functions 85. A weighting function, 87 is combined with the represented concepts, 86 and 88 and a transfinite interpolation process, 89 produces a resultant composite field, 90, whose components vectors are stored in 91, a spatial data MVP Tree (Multi-Vantage Point Tree).

Figure 10:
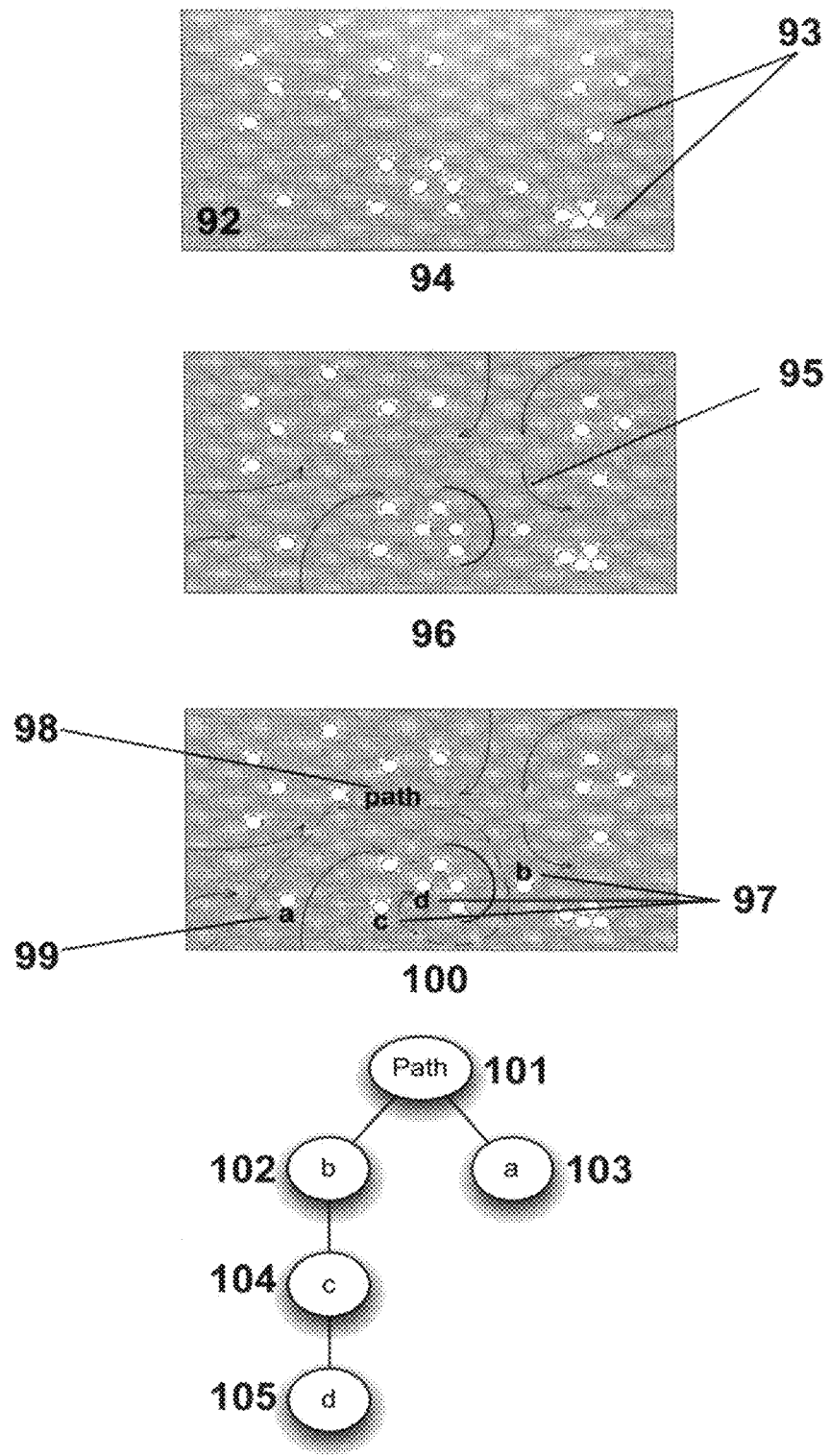
FIG. 10 illustrates computing distance fields for ontology induction using conceptual relativity.

FIG. 10 illustrates the process where a space 92, evolves so that data representations in the space as small virtual particulate regions, 93, represent a totality of implicitly defined concepts as data bounded within the region, 94. The vector potentials drive the motion of the virtual particulate regions in paths, 95. Stable point 99, corresponding to virtual particle "a" and stable points 97 corresponding to particles "b", "c" and "d" are connected by low-energy paths, 98, and bounded in region 100. By starting with the path, 101, there are two siblings, 102 and 103 corresponding to "b" and "a" respectively. 102 has child 104 which in turn has leaf 105.

Figure 11:
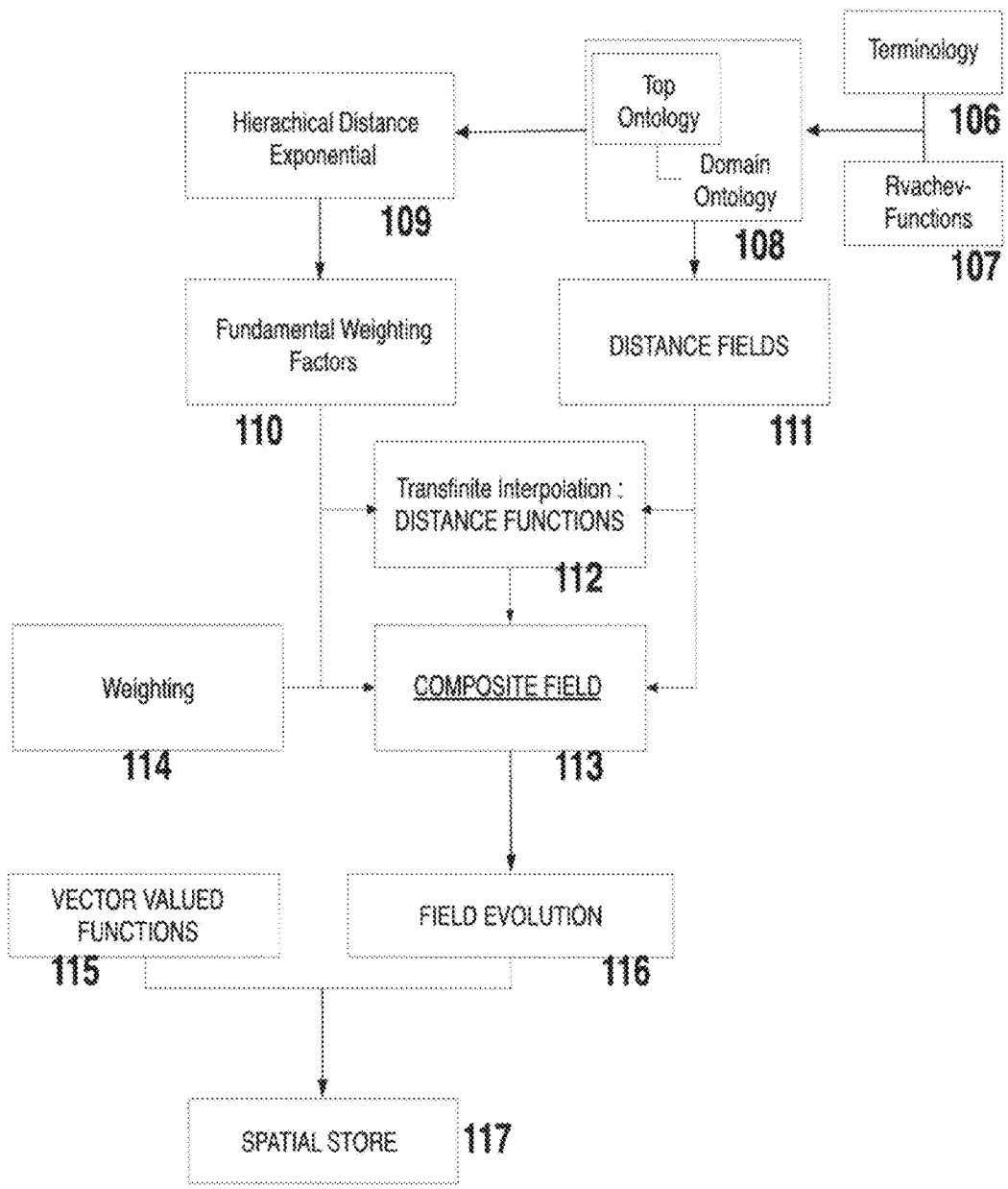
FIG. 11 illustrates data clustering flow chart using ontology via distance fields.

FIG. 11 summarizes the entire flow for the whole process of computing the conceptual relativity vector field. A terminology, 106 corresponding to an ontology with a top and domain, 108 is combined with Rvachev-functions 107 to produce distance fields, 111. The ontology is used to compute the hierarchical distance exponential, 109, to which fundamental weighting factors are added, 110 and combined with 111 into a representation 112 that uses transfinite interpolation functions that combines with weighting, 114 to produce a composite field 113 to which vector valued functions 115 are assigned that allows for the computation of field evolution, 116. The final stable vectors of the field are stored in a spatial store, 117.

Referring to FIG. 1, the invention is based on the idea that the distance between concepts is relative by constraining the distance from any concept in the hierarchy to the Top 1 of the ontology is to be a first constant, such as zero, and that the distance from the Top 1 (aka the set that contains everything) of the ontology to the Bottom 2 of the ontology (aka the absurd set) is defined a second constant not equal to the first, such as unity. The functions used to represent and compute with distances are implicit functions called Rvachev Functions.

Rvachev-functions are described as follows: A Rvachev-function is real a valued function $f(x_1, x_2, \ldots x_n)$ if its sign is completely determined by the signs of its arguments $x_1$. A Rvachev-function is a Boolean switching function, changing its sign only when its arguments change their signs so that every formal logical sentence has a corresponding Rvachev-function, whose signs are essentially determined by the truth table of the logical sentence. Just as any logical function can be written using only three operations: "not", "and", and "or", so that any logical sentence is some composition of the three corresponding Rvachev-functions. The negation operation, for example, causes a change in the sign of the Rvachev-function. The present invention combines Rvachev-functions with implicit representations of distance fields and use the representation as a means to map distances between attributes and collections of features to definitions of concepts (that are themselves defined by said attributes or feature sets).

Generalized Distance Field:

For any closed set C, in a real space of n-dimensions, such as a general Hilbert Space, it can be said that function σ: $R^n \to R^l$ is the distance function if it associates with any, p, in space a non-negative real number equal to the real positive scalar distance from p to C. In effect, an iso-distance contour is a level set of C's that share the same distance with respect to property of reference. The approximate field is given by an n-th order derivative for the boundary and the solution set is the Rvachev-function or composition of Rvachev-functions that approximate the boundary to n-th degree derivatives. The boundary of a field is therefore an uncertain point and, at the boundary, methods of three-valued logic may be applied in that elements interior or exterior to the boundary are crisp, while elements on the boundary are uncertain. Any exact distance fields, that may actually be analytically unknown, can be replaced with an n-th order approximation by using approximation functions that simulate the field structure and, in an associated fashion, any concepts whose graded features may degenerate to uncertain values, within the boundary, may therefore also be represented.

The distance field is called normalized if the n-th order approximation of the distance function u is a function u' that is obtained by requiring that only some of the higher order derivatives vanish for all points p on the boundary of S. Normalized functions behave like a Euclidean distance function near its zero set and smoothly approximate the distance away from S. However, normalization is a local property and cannot guarantee that the function behaves as the distance far away from the boundary constraint points. The description of a point set (topological shape) by a real-valued function of point coordinates is a problem of analytical geometry and concerns the analysis of the shape for the given analytical expression. The inverse problem of analytical geometry is to find an analytical description for the given shape. This can be extended to algorithmic definitions of functions and to multidimensional point sets of various kinds and constraints.

For instance, let: $\mu = \omega \cdot \Sigma C_i \aleph_i$

The distance function μ is represented by the linear combination of basis functions, $\aleph_i$ with coefficients, $C_i$. This expression is the simplest example which represents the space of solutions for the given problem with homogeneous boundary conditions. For functions that provide implicit distance fields, and for whom there is also mapping to Boolean logic, these kinds of functions are called Rvachev-functions.

There are several types of boundary conditions listed below in "a" through "e" which are commonly encountered in the solution of partial differential equations and that can be used:
 a. Dirichlet boundary conditions specify the value of the function on a surface T=f(r, t).
 b. Neumann boundary conditions specify the normal derivative of the function on a surface.
 c. Cauchy Boundary conditions of a partial differential equation which are a weighted average of Dirichlet boundary conditions (which specify the value of the function on a surface) and Neumann boundary conditions (which specify the normal derivative of the function on a surface).
 d. Robin boundary conditions. For an elliptic partial differential equation in a region Ω, Robin boundary conditions specify the sum of αμ and the normal derivative of u=f at all points of the boundary of, Ω with α and f being prescribed.

Rvachev introduced the concept of a "solution structure" which Kantorovich proposed the homogeneous Dirichlet conditions are satisfied exactly by representing the solution as the product of two functions: (1) an real-valued function f(x)=0 on the surface; and (2) an unknown function, that allows to satisfy (exactly or approximately) the differential equation of the problem:

$$S(x) = f(x) + \mu; \mu = \omega \cdot \Sigma C_i \aleph_i$$

For the approximation case: $S(x) = f(x) + \mu + \varepsilon(x)$ relative to, ε, that is usually indeterminable exactly and a-priori.

Rvachev identified that μ can be considered a remainder term in a special case of a generalized Taylor series expansion of μ in the neighborhood of the boundary by the powers of the distance ω to the boundary (the surface for which f(x)=0). Different coefficients result in different functions and all of them satisfy the boundary conditions independent of the system of basis functions. Each "solution structure" consists of an approximation, S(x) with respect to an interpolation part (for a locally linear embedding) that includes terms which interpolate the given functions from the boundaries at f(x)=0 and satisfy the non-homogeneous boundary conditions. The solution structure, however, does not take into account any context governing equations for the boundary value problems: this must be done separately.

The construction of an analytic solution structure depends on the ability to build a distance field ω over the level sets of the semantic domain, for which an Rvachev-function, f(x)=0.

f(X)>0—for points inside the semantic region;
f(X)=0—for points on the semantic region's boundary and which are, by definition, in the Ontology of terms and map these to the Boolean semantic interpretation "TRUE";
f(X)<0—for points outside the semantic region, and map this to the Boolean semantic interpretation "FALSE";

When the $f_i(x)=\Psi_i$ (wavefunctions) then the superposition of the is equivalent to the composition of the different functions, f. In this sense, a discrete and continuous mapping of logic and semantics into analytic function spaces is obtained.

The important point is that the method is suited to Quantum Computing systems technology since the method allows representations by superposition of wavefunctions representing conceptual entities. The feature function F(σ, x, y, z) for a concept C that defines a surface, S. Note that S is a point set of member attributes that define the feature completely.

In general F may depend on any number of parameters. Consider behavior of F as a function of distance σ, while keeping all other variables fixed. By definition, for all points p belonging to the point set, S, for the feature, F, it must be that $$F(\sigma(p))=F(0)$$

As p is varied some distance away from S, the value of F(p) can be expressed in terms of values and derivatives of F(0) (i.e. In terms of the original set of points as members of S, which define the feature.

If it is assumed that for every point p in the space that there exits a function that maps the distance from p to each of the pi's in its local vicinity within some defined boundaries (i.e. there is a specified region or area). Then this function will generate a partitioning of the space that consists of convex areas around p (convexity is here defined in terms of the assumed distance function being positive and real valued). The result is a type of Voronoi tessellation (although the shapes may not necessarily be polygonal) of the space around the central points for each locale. This locale is a sub-space of the total space (since it has been partitioned by the distance function around its centroid point). The standard Voronoi tessellation is based on the ordinary Euclidean metric, so that in order to determine the lines that form the tessellation one needs to solve the equation:

$$Si(vi-xi)2=Si(wi-xi)2$$

where v=(v1, . . . , vn) and w=(w1, . . . , wn) are the vectors of two prototypical points in the space.

However, instead of saying that there is only a prototypical point for a particular region define that there is a prototypical area and then it is trivial to determine a generalized Voronoi tessellation by computing distance functions with respect to such regions. Some centroids of some concepts will have 'larger' subspaces (areas) than others, or contain smaller subspaces (of other centroids, in the case of nested fields representing entailed or subsumed concepts) such as, for example, the concept of "animal" can contain "pet" and "pet" can subsume "horses", "dogs", "cats", "birds" etc. . . . . .

Each level of an ontology or taxonomy is a subspace defined under the "type of the linking relations" (with names such as: isa, hasa or part-of), and that the children at each level belong to that subspace, inheriting features of the parents and parents using those features available from a top ontology. So, a level called "Animal" can have many members (like pets, wild, dogs, wild-dogs) but with features from a top ontology, like "color, size".

In order to account for the "blending" between features of concepts and contexts and concepts with each other, a method to combine the features of the concepts together is presented so that, for example, "dogs" and "wild-dogs" can be distinguished in terms of being "pets" or not, while both are categorized as "animals". The present invention defines conceptual properties in terms of Rvachev-functions, F(u, x, y, z) for a feature set F (containing various $f_i$).

Individual concept feature functions may be combined into a single conceptual feature function $F^\Omega$(F1, F2, F3, . . . Fn) in a convex combination:

$$F\circ(p)=\Sigma_{i=1}^{n} F^i(p)\cdot W_i(p)$$

Where each weight scales the attribute associated with that feature of that particular concept. No assumption is made about the form the feature functions, $F^i$, that define a concept. These functions can be defined in terms of dimensional variable (as in LSA, or MDS) or implicitly in terms of the distance fields themselves.

The transfinite interpolation is explicit about the convex combination of all the feature functions into a single, composite function. For concepts represented by various features, then the same method can be applied to compose a new concept in terms of a transfinite interpolation of existing features of concepts such that:

$$C(p) = \sum_{i=1}^{n} F^i(p) + \text{Error} = 1.0$$

The composite concept C(p), is a function that forms a partition of unity as composite of n other concepts, defined by their respective Rvachev-functions which are the feature function, $F^i$ that define the properties (or attributes) "p".

In the case of error, it is defined, (as would be measured from subjective or empirical evidence or statistical measures and the calculated ab-initio values), that this error reflects the degree to which there is missing information, or as a measure of "ignorance".

TABLE 1

Tabular Layout of Ontology

| Entry | Concept | Parent Level | Siblings | Sibling Level |
|---|---|---|---|---|
| 1 | Top | 0 | — | 0 |
| 2 | Vehicle Broken | 1 | Engine, Fuel, Battery, Parts, Congestive | 2 |
| 3 | Engine Broken | 2 | Fuel, Parts, Battery | 3 |
| 4 | Fuel | 2 | Empty, Full, Bad | 3 |
| 5 | Parts | 2 | Spark-plug, Piston, Cylinder | 3 |
| 6 | Battery | 2 | Empty, Full, Bad | 3 |
| 7 | Congestive | 2 | Oil pipe blocked, Fuel pipe blocked | 3 |

Table 1 shows an example in the ontology of a broken vehicle. For instance, for the problem of the engine not starting. The Top 1 is considered Level 0. Level 1 includes the problem "Vehicle Broken" and the set of the various causes as siblings. Each of the causes is shown in Level 2 has sibling causes as a set of further causes for each of the causes at Level 3.

The present embodiment of relative conceptual distance takes into account the node and edge based influences, which correspond to a relational based and attribute (content) based contribution. In order to relate these factors to empirical, statistical or subjective judgments statistical, Bayesian, or evidence based models (such as Dempster-Shafer) can be used which can be reduced to a metric or if the contributions of several of these factors are reduced to 0, then, referring to FIG. 1, the metric between Top 1 and Bottom 2 remains at 1.

A given taxonomy or ontology is often represented as a hierarchical structure an example is provided in FIG. 6. Therefore, evaluating semantic similarity between nodes in the hierarchy can make use of the structural information embedded in the information content of a node and the type of the relationships connecting the concepts. Given a node that represents a unique concept and an edge that represents a directed relationship between two concepts, the similarity between two concepts is the extent to which they share information in common relative to how this shared information is relevant to the "type" of the relationship. This common information can be identified as the concept node that subsumes both of the two in the hierarchy to which the same relationship type applies, as for example, in FIG. 6, 53 "VEHICLE" is a 54 "CAR" is a 56 "BRAND" which in turn is a 57, 58 or 59; this concept, 53, is the immediate grandparent in the hierarchy of, for example, 54 to 56 to 59. For example, the concept type "VEHICLE" 54 subsumes both "CAR" 54 and "BIKE" 55 and the two concepts "CAR" and "BIKE" share some common parentage as being of type 54, "VEHICLE".

The rule that the shorter the path from one node to the other, the more similar with respect to link length distance the two concepts are, is applied. Parent nodes can have many child nodes and so there will exist distances between any two adjacent concepts (at the same level of a hierarchy) that are not necessarily equal, although the concepts are similar. Therefore, the factor that the edge connecting the two nodes is weighted, is added. The constraint that the greater the number of siblings at a level, the closer the distance between the siblings is, is applied and it can be considered that siblings at a given level represent the density at that level if a normalized unit area function is used to represent the level. The area function can be as simple as a constant, in which case the density is simply the number of siblings or the function can be more complex if the siblings have differences in their attributes that may be best represented in terms of a shaped area over which density can vary as clusters of siblings at a more fine grained level of representation, i.e. that some siblings may be closer than others and ontologies or descriptions may not in the coarse case capture these real differences.

The rule is that the distance shrinks as one descends the hierarchy is applied, since differentiation is based on finer and finer subsequent distinctions between concepts as one descends the hierarchy. This rule constrains the link strength (LS), which is simply the difference of the semantic information content values between a child concept and its parent concept. For example, motorcycles and cars are both vehicles but they differ in the number of wheels amongst other differences.

Irregular densities of links between concepts can result in unexpected conceptual distance outcomes. Also, without causing serious side effects elsewhere, the depth-scaling factor does not adjust the overall measure well due to the general structure of the taxonomy (e.g. higher sections tend to be not too similar to each other). It normally concentrates a coarse result for the comparison of concepts. In particular, it does not differentiate the similarity values of any pair of concepts at a level in a cluster when their parent is the same.

The type of a semantic link corresponds to the edges between concepts in concept network and defines the relation type, as edges, between nodes representing the concepts and that these nodes are themselves defined in terms of the Rvachev-functions of the respective attributes that implicitly define the concept. One example of a link type is the hyponym/hypernym (IS-A) link which is the most common type of link. To differentiate the contribution of a link type to the weight of edges connecting a node and all its child nodes, one needs to consider the link strength of each specific child link type. This could be measured by the closeness between a specific child node and its parent node, against those of its siblings using statistical, such as Bayesian, or evidential, such as Dempster-Shafer or subjective judgment, such as confidence measures.

However, without a method of normalization of the semantic content for comparison purposes, relative relations cannot be performed. Hence, the following can be written: the distance between c1 and c2 will vary as the distance function $D(f(c1), f(c2))$;

let c=concept and p=parent,
Then the contribution from parent to child is $f(p,c)$ and defined as follows:

$$f(p, c) = [[(\rho^\delta(c)/\rho^\delta(p) + (\psi(c)/\psi(p)))] \times (\chi(p)/(\chi(c) + \chi(p)))] \times \tilde{\omega}(\tau)$$

where $(\chi(p)/\chi(c))$ is the relative information content of parent to child and, $\delta$, is density (the number of siblings at level).

If out of context, then, $\tilde{\omega}(\tau) = 0$ and $f(p, c) = 0$
If child and parent are equally important, then $(\psi(c)/\psi(p)) = 1.0$
If child and parent are equal in information content, then $(\chi(p)/\chi(c)) = 1.0$
For parent at depth=0 (i.e it is at the Top 1), with density=n, then if there is only one child and the child density is 1, there is parent density that is child density and the relative influence of parent on children is:

$$\rho^\delta(c)/\rho^\delta(p) = 1^1/1^0 = 1/1 = 1$$

However, since $\chi(p)$ is at the Top 1, it must include the information content of all subsumed levels, in this case, $\chi(c)$=Content of Parent+Content of Child.

And Content of Parent=Content of child, so that:

(χ(p)/(χ(c)+χ(p))=1/(1+1)=½.

The contribution is defined, f(p,c) as when p=Top, that the Top 1 contributes everything always for any and all levels. At the Top 1, the context is always ω(τ)=1.
Hence, f(Top,c)=f(p,c)=[(1+1)*½]*1=1.0

Therefore, the relative contribution using the grandparent is: f(p,c)*f(gp,c)
Hence, the definition of the absolute conceptual distance is:
Da(p, c)=1.0−f(p, c); if p=Top, then Da(p, c)=0 where the parent is the Top 1.
Hence, relative conceptual distance based on contribution is, Dr(c, p), using the grandparent, gp:

Dr(p,c)=1.0−f(p,c)*f(gp,p)

Again, if at the Top 1, then:

Dr(p,c)=1.0−f(p,c)*f(gp,p)=1.0−f(p,c)*f(gp,p)=1.0−1*1=0.

Relativistic Conceptual Distance is defined using the exponential and scaling and offsets illustrated in FIG. 3, fundamental factors which are applied so that the distance from the Top 1 to the Bottom 2 remains a constant and that the difference from any concept in the hierarchy to the Top 1 is also some other constant where the relative conceptual distance, f, is defined as the following exponential distance equation:

$$f(p,c) = (e^{-(Dp_T/Dc_T*(Level_p/Level_T))}) * \text{RelativeDistanceLevel} - 1)$$

where f(p,c) is the hierarchical conceptual relative distance from the parent p to the child c and where it is clear that $e^{-(Dp_T/Dc_T*(Level_p/Level_T))}$ can only have a maximum value of 1.0, when the exponent is zero, which exists only in the case that the fundamental structure is a Top 1 with a Bottom 2 and no intermediate nodes (in other words, that $Dp_T=0$). $Dc_T$ is the total number of children in the child hierarchy at all subsumed levels and $Dp_T$ is the number of total subsumed concepts of the parent concept. $Level_T$ is the total number of levels in the hierarchy (maximum from the perspective of the parent) and $Level_p$ is the level of the parent and where the RelativeDistanceLevel is the distance between the parent concept and the immediate grandparent concept using Rvachev-functions to map the contributions of fundamental factors to the final distance with a weighting based on link depth. In other words, a shaped area defines each level with a density proportional to the weighting and the number of siblings, with coefficients based on the fundamental factors shown in Table 2:

F is a function of distance u (all other variables fixed, then, by the definition of the distance-field concept, for all points p defining conceptual feature have a distance value of "zero". Since the Top has the distance value zero this eliminates the requirement to know the depth of the total hierarchy. As point p moves downwards through the hierarchy and hence a distance away from the Top, the value of F(p) in terms of values and derivatives of F(0) using a Taylor series expansion (since it is smooth and differentiable) with respect to the distance from the top such the successive levels have a smaller difference in distance is:

$$F_i(u_i) = F_0(0) + u_i F_1(0) + \sum_{k=2}^{n} \left(\frac{1}{k!}\right) F_k(0) u_i^k + u_i^{m+1} \cdot \Phi$$

Rvachev pioneered this representation of a general field function. It is a straightforward generalization of the classical Taylor series, where the term |x−x0|, measuring the distance to point x0, is replaced by u, measuring the distance to a set of points S. One function that has the ideal properties is the exponential function so the relative distance measure is defined to be derived from the Taylor series for $f(x)=e^x$ and with the distance property as αu, then with center at is $x_0=0$ (all derivatives are of the form $e^x$, so at $x_0=0$ they evaluate to 1). Therefore the Taylor series has the form (φ is for the error term):

$$F_i(u_i) = e^{-u} = -1 + \alpha u_i - \frac{(+\alpha u_i)^2 \cdot u_i^2}{2!} + \frac{(-\alpha u_i)^3 \cdot u_i^3}{3!} + u_i^4 \cdot \Phi$$

where α=Sibling Ratio; u=f(p,c)=Distance down the hierarchy

The conceptual distance for Feature, $F_i$, will vary as the density of the number of siblings down the tree for the feature, $F_i$ with scale relative invariance. By varying the properties of α (from 0 to N) the measure of distance, down the hierarchy will vary such that differences between successive levels approaches zero and the distance will vary down a path from most general concept (most siblings) to most specific concepts (fewest siblings). Semantic Distance varies as: $D_{01} < D_{12} < D_{23} < D_{34} < D_{45}$ where D is 1−f(p,c).

An example calculation using the SNOMED-CT Ontology as a source and applying the exponential distance equation, though equivalently, any ontology or taxonomy of concepts, such as the SUMO ontology or WordNet could also be used:

TABLE 2

Fundamental Factors

| Description of Contributing Factors | Symbol | Semantics | Proportionality |
|---|---|---|---|
| Content Factor | χ | Concept Weighting value | Feature Sets |
| Relevancy Factor | ψ | Relative importance | Link Strength |
| Density Factor | ρ | Resolution between concepts | Links per Node wrt set of all link types |
| Depth Factor | δ | Relative Geometry | Hierarchy |
| Relationship Type Factor | τ | Relative Scaling | Function on types |
| Directed Order Factor | ω | Context | Scaling wrt to adjacency |

LISTING 1
Sequence example computations of hierarchical
conceptual relative distance Level 1—Top Distance from Top to Bottom = 1.0
Relative Distance = 1 − 1.0 = 0.0
Level 2—Cardiovascular Diseases (2000 Siblings)

Hierarchy = exp − (((250/2000) * (2 − 1))) = 0.8824969025845955
Relative Distance = 1 − 0.8824969025845955* 1 =
0.1175030974154045
Level 3—Congestive Heart Failure (250 Siblings)

Hierarchy = exp − (((6/250) * (3 − 1)) = 0.9531337870775047
Relative Distance = 1 − 0.8824969025845955*
0.9531337870775047 = 0.1588623851553768
Level 4—LV Systolic Dysfunction (5 Siblings)

Hierarchy = exp − (((1/5) * (4 − 1) ) = 0.5488116360940265
Relative Distance = 1 − 0.1588623851553768*
0.5488116360940265 = 0.581885436301
Level 5—LV Systolic Dysfunction, Class III HF (1 Sibling)

Hierarchy = exp − (((1/1) * (5 − 1) ) = 0.01831563888873419
Relative Distance = 1 − 0.5488116360940265*
0.01831563888873419 = 0.989948164255

This distance at the top node in the ontology being is 1.0 since the topmost node is at the zero-th level and this grounds the means to have relative scaling. The exponential function can be extended indefinitely to arbitrary depths, and this is useful as new knowledge is added to the hierarchy over time.

Concepts can exist in multiple places within a hierarchy because of varying re-description (e.g. some vehicles that are SUV's are both a truck and a car or some creatures that are both plant like and animal like such as fungi). To compute the relative conceptual distance between two concepts that each have multiple instances, the minimum of the pair wise comparisons of the distances between each instance of each concept and their common parent is used as the relative conceptual distance. Referring to FIG. 3, the table of Fundamental Factors, which form part of our invention of semantic distance that takes into account node and edge based influences, which correspond to an algebraic (content) and geometric (topological) contribution.

Therefore, the following six contributions need to be accounted for and required for whatever other basis is chosen on the distance: Content Weighting, Link Strength, Sibling Density, Link Depth, Relationship Type Structure and Order Structure.

1. Content (Weighting)

The weighting function $W_i$ on the concept i is the only means for expressing the contribution of the attribute onto the concept under discussion (as a function of distances to the point set) $p_i$ associated with the features of the concept, $F_i$.

Then, the relative influence of these weights describes the normalized relative conceptual distance, and the weight functions, therefore, associate a function $\beta_i(p)$ with each observable attribute or feature of the concept. Therefore, each weight function $W_i$ of feature of $F_i$ is simply the normalized content weighting $\chi$ given by:

$$\chi = W_i(p) = \frac{\beta_i(p_i)}{\sum_{k=1}^{n} \beta_i(p_k)}$$

Normalizing the weighting by the totals of all weightings is handled by a straightforward normalization of each weighs by all contributing weights which provides the content factor, $\chi$. For example, if $\beta_i(p_i)=1$, then $\chi=1/n$, Then the content weighing varies linearly and the linear combination of concept functions becomes the weighted average of the individual point set, $p_i$. For example, if $\beta_i(p_i)=h^{-u}$. Then the content weighting varies as an inverse power law of the function h and u, the exponent.

2. Link Strength

The link strength is proportional to the shared features between parent and child and the result of these two operations is then normalized by dividing them by the link depth between grandparent and child, since the grandparent accounts for the common shared features between parent and child.

Here is a trivial illustrative example with 3 similar but not equivalent children with respect to {a, b, c, d, e} as the features in the grandparent node where ~ means "is proportional to":

Grandparents = {a, b, c, d, e}

→ Parent = {a, c, d}; contribution to link strength by content ~ 3/5

→ Child01 = {a, d}; contribution to link strangth by content ~ 2/5

→ Child02 = {a, c}; contribution to link strength by content ~ 2/5

→ Child03 = {a}; contribution to link strength by content ~ 1/5

Link strength may be derived from physical models such as potential functions or virtual gravity functions. Link strength may also just be set to a constant.

3. Sibling Density

The density is the total number of links in the hierarchy at the level divided by the number of links per node at any given level. The number of different types of links at a node is proportional to the dimensionality of the local feature space of the concept and the relevancy of the concept with respect to the total feature space (all the types of the links that exist uniquely in the hierarchy). The sibling density function can also be computed as the factorial of the number of nodes at a level with respect to the number of links normalized from a scale of 0 to 1.

4. Link Depth

The depth is simply the number of links up or down in a hierarchy. The relative distance level for a link of a given type is weighted and with respect to depths of parent and grandparent to child which becomes a factor in the exponential conceptual relative distance equation. In this case, each link going up or down can have a link strength contribution with a distance weighting ωwhich may be derived from statistical, or belief, or confidence or other factors.

Let the depth of a grandparent be, Lgp
Let the depth of a parent be, Lp
Let the depth of a child be, Lc
With three-levels: child (Level=3)←parent (Level=2)←grandparent (ex. Level=1)

LinkDepthFactor=LDF(ChildLevel)=ω*(Lc/Lp)

Since:
Lc=Lp+1;
Lp=Lgp+1;

LinkDepthFactor=LDF(3)=ω*(Lc/(Lgp+1))=ω*1.5

For a child at level 5:

$$LDF(5) = \omega*(5/(3+1)) = \omega*1.25$$

So the depth factor contribution decreases with increasing depth to a limit of 1.0. The depth factor is contributed as a weighting on the conceptual relativity exponential distance equation, 5. Relationship Type Structure The relationship type structure provides a representational re-description of the concepts in terms of Rvachev-functions. Relationships between concepts are defined using distance fields based on using Rvachev-functions which are implicit functions that also permit the use of Boolean logical operations to represent the logical operations on the distance fields. Table 3 illustrates some example Rvachev Functions and the mapping to logic.

TABLE 3

Example Rvachev-functions and use of mapping functions to Logic

| LOGIC | Mapping | RVACHEV-FUNCTION |
|---|---|---|
| ∧ | min(x, y) | $x + y - [x^2 + y^2]^{1/2}$ |
| ∨ | max(x, y) | $x + y + [x^2 + y^2]^{1/2}$ |
| ¬ | not | $-x$ |
| True | Constant | C |

The relationship of the taxonomy or ontology to Rvachev Functions is that each level corresponds to a distance field, and, each distance field is a subspace for containing other embedded distance fields, such that hierarchical structures are equivalent to multidimensional Venn-Diagrams.

Table 4 shows an example Relationship Type Structure for each term of an ontology of column heading 1, which is represented by an Attribute-Value Pair (AVP) in column heading 3 and a topo-geometrical structure, $\Omega$ in column heading 4. Entities, such as "Vehicle Broken", are defined by one or more attribute-value pairs (e.g., "Has Behavior"+ "Broken"). "Vehicle Broken" and "Engine Dead" share two attributes. "Acute Vehicle Broken" adds an attribute-value pair "Has Modifier"+"Acute" (which could mean that there is no fuel or the battery is dead). Definitional attribute-value pairs are mapped to distance field structures in column 5 expressed by symbols, $\Omega_n$.

TABLE 4

Representation of Concepts as Relationship Type Structures

| Description of Conceptual Terms in Ontology | Attribute-Value Pair (AVP) | | | Structure |
|---|---|---|---|---|
| Entity | Attribute | Value | AVP # | $\Omega_n$ |
| Vehicle Broken (C1) | Has_Behavior | Broken | AVP1 | $\Omega_1$ |
| | Has_Location | Engine | AVP2 | $\Omega_2$ |
| Acute Vehicle Broken (C2) | Has_Behavior | Broken | AVP1 | $\Omega_1$ |
| | Has_Location | Engine | AVP2 | $\Omega_2$ |
| | Has_Modifier | Acute | AVP3 | $\Omega_3$ |
| Engine Dead (C3) | Has_Behavior | Broken | AVP1 | $\Omega_1$ |
| | Has_Location | Engine | AVP2 | $\Omega_2$ |

Ontologies can contain formal definitions where concepts are defined by one or more Entity-Attribute-Value (EAV) triples. For example, the formal definition of the concept "Engine Broken" in Table 4 is composed of two entity-attribute-value triples. Values are selected from definitional subsumption hierarchies for pathology and anatomy.

Consider the example in Table 4 of three related concepts (C1-3) and their formal definitions composed of attributes (e.g., "Has Behavior") and Values (e.g., "Broken) for which FIG. 4 illustrates that attributes 29 and 27 for concepts 22 and 23 can be mapped via relations 25 and 26, such that attributes of concepts can have a different distribution and structure relative to the distribution and structure of the concepts they, in part, each describe.

Rvachev-functions are inherently compositional and allow representation of distances from arbitrarily complex formal definitions. A necessary first step is to develop primitive logical Rvachev-functions that represent each Attribute-Value Pair (AVP) comprising the concept's formal definition. An AVP can be defined as a mathematical model of an object property of arbitrary nature defined at any point of the point set. In order to map each definitional AVP to an Rvachev-function, inequalities that limit the extent of the attribute in the topology by defining its boundary are defined. A concept in multidimensional space is defined by a continuous real-valued function of point coordinates F(X). The points with F(X)<0 belong to the concept, and the points with F(X)>0 are outside of the concept. Choose the normalized interval [(−1, 0], [0, +1)] for the valuation of the terms of the concept and the AVPs that define it. Use the signs of the Rvachev-functions to represent a concept's truth value (i.e. "No evidence of Engine Broken" vs. "Evidence of Engine Broken").

Referring to Table 4, the Rvachev-functions to map the discreet concepts (e.g. "Engine Broken") from the ontology to an affine continuous distance field (e.g., all possible types of engine failures) are exemplified by the steps of the process for mapping concepts and attributes to distance fields via Rvachev-functions as follows:

Define regions of space, $\Omega 1, \Omega 2, \Omega 3$ that correspond to each AVP with the provision that $\Omega 1 | \equiv \Omega 2 | \equiv \Omega 3$ (that the first topology entails the others)

Define Rvachev-functions ($\omega 1, \omega 2, \omega 3$) that relate the AVPs with their defining region of space ($\Omega 1, \Omega 2, \Omega 3$) and write inequalities on the defining primitives to define the topologies.

$$\Omega_1 : \omega_1 \geq 0$$

$$\Omega_2 : \omega_2 \geq 0$$

$$\Omega_3 : \omega_3 \geq 0$$

For each concept, apply the Rvachev-function mappings to rewrite the structural representation of each concept as follows:

$$Concept_1 \equiv \Omega_1 \cap \Omega_2 \cap \neg \Omega_3$$

$$Concept_2 \equiv \Omega_1 \cap \Omega_2 \cap \Omega_3$$

$$F(R_{Concept(1)}, R_{Concept(2)}) = \frac{\int E(f(R_{Concept(1)}) - f(R_{Concept(2)})) \cdot dx}{\int \max(R_{Concept(1)}, R_{Concept(2)}) \cdot dx}$$

Next an Rvachev-function for Concept 1 "Engine Broken" written:

Let: $(\Omega_1 \cap \Omega_2) \equiv \omega_4$ $\therefore \omega_4 = \min(\omega_1, \omega_2)$ Let: $\neg \Omega_3 \equiv \omega_5$ $$\Omega_1 \cap \Omega_2 \cap \neg \Omega_3 = \min(\omega_4, \omega_5) \equiv \omega_4 + \omega_5 - [\omega_4^2 + \omega_5^2]^{1/2}$$

Therefore, the Final Rvachev-Function for Concept 1 (Rc1) is:

$$R_{C1} \equiv \Omega_1 \cap \Omega_2 \cap \neg\, \Omega_3 \equiv (\omega_1+\omega_2-[\omega_1^2+\omega_2^2]^{1/2})+(-\omega_3)-(((\omega_1+\omega_2-[\omega_1^2+\omega_2^2]^{1/2})^2+\omega_3^2)^{1/2})$$

Each concept, C, will have a distance to the regions bounded by its attribute-value pairs and it is noted that several algebraic systems exist to solve and compute Rvachev-functions such as Mathematica™ or Matlab™ etc. and/or a particular machine such as a computer programmed to solve Rvachev-functions.

For each of the Fundamental Factors, a Rvachev-function mapping can be created such a single composite mapping of all factors as contributors to the relative conceptual distance measure can be composed. For example w the factors $\chi$ can be mapped to Rvachev-functions as follows:

$$x+y-[x^2+y^2]^{1/2} \rightarrow \chi+Z-[(\chi)^2+Z^2]^{1/2}$$

$$\Omega_{1\chi}: \omega_1 \geq 0; \omega_1 = \chi_1+Z_1-[(\chi_1)^2+Z_1^2]^{1/2}$$

Referring to Table 4, the structural representation for the factor $\chi$ is represented by $\Omega_{1\chi}$.

The composition of all the $\Omega$ structures is trivially derived as the composition of the Rvachev-functions. Queries using the terms of concepts and attributes can be formulated as Rvachev-functions and these can be used in search and retrieval. The algorithm and process is given as:

Algorithm for Mapping of Concepts and Features to Rvachev-Functions:

1. Write equations of boundaries of an entity's attributes
2. Convert them to "greater or equal to 0" inequalities
3. Write logical expression combining regions of space defined by the inequalities into the semantic entity
4. Substitute logical functions by corresponding R-functions, logical arguments by left hand sides of inequalities. The resulting function is equal to 0 on the boundary of the semantic entity, greater then 0 inside the entity's region and less then 0 outside the entity's region
5. Compose functions to represent logical statements representing complex concepts. Referring to FIG. 4, concepts P1 and P2 are composed of multiple, sometimes shared, Rvachev-functions, with constraints as defined that:
   (a) d(t1, P1, P2) must express the equivalency between concepts P1 and P2 with respect to term, t1 and similarly for the others as noted in the FIG. 5.
   (b) D(P1, P2) is calculated from a composition of the various individual distances (this can be done because R-Functions theory preserves R-Functions for combinations and compositions).
   (c) D(Grandparent, Parent)>D(Parent, Child) because distances relatively decrease between levels downward in the hierarchy.
   (d) D($_T$, P)=0 by definition since the distance from the Top to any intermediate node is defined to be zero; and
   (e) D(P,P)=0; distance between a concept and itself is zero also The degree of similarity between C1 and C2 is measured by the distance between concept-level composite Rvachev-functions from the set of Rvachev-functions describing each definitional AVP The distance field, D, between Concept 1 and Concept 2: D(C1, C2)≡Concept 1≡$\Omega_1 \cap \Omega_2 \cap \neg\, \Omega_3$ to Concept 2≡$\Omega_1 \cap \Omega_2 \cap \Omega_3$ Relativistic conceptual distance is integrated into the AVP Rvachev-functions when AVP values have a hierarchical relationship to each other. Concept-level composite Rvachev-functions (e.g., $R_{C1}$) are composed of multiple lower level primitive AVP Rvachev-functions (e.g., $\omega_1$, $\omega_2$, $\omega_3$). Referring back to FIG. 4, composite semantic concepts 22 C1 and 23 C2 are commonly described by multiple attributes 27 and 29 or more primitive concepts, as shown in FIG. 5, correspondingly 31, C1 and 32, C2. The semantic representation using Rvachev for single primitive concepts integrate their single Rvachev-functions into a single composite Rvachev-function describing the composite concept ($R_{Concept(x)}$). This composite concept ($R_{Concept(x)}$) for a relativistic distance measurement as shown in FIG. 5, where C1 and C2 are related concepts and can be precisely described by M other more primitive concepts, therefore, each concept, C, is ascribed distance by values of its k numbered AVPs, $A^k$. In this case, the relative concept-level distance between concepts is denoted:

$$d(\Omega n, C1, C2)$$

This denotation expresses the degree of similarity between C1 and C2 with respect to a distance field, and shown in FIG. 4, the concepts C1, 22 and C2 23 may be separated by a gap, 24 which may be small or large. In the case of gap, the width of the gap denotes the distance between 23 and 22 or concepts C2 and C1 respectively.

The composite field distance between concepts, CDF(C1, C2), is calculated from a composition of the various individual concept-level distances since Rvachev-functions theory preserves logic for combinations and compositions by using the exponential distance equation.

In order to get the logical composition of attributed entities and to measure the distance between two complex concepts, the relative "area" measures (using their respective distance field Rvachev-functions) are taken to get the relative contributions of all contributing distance factors in terms of the area (a geometric feature) and normalize this with respect to the maximal distance values (also as areas to preserve dimensionality) as defined by the following Z-equation:

$$Z(i,j) = 1 - \sum_{i,j=1}^{N} a_{i,j}\left(1 - \frac{(Ncs_{i,j}c(m)+1)}{Nc+1}\right) + \sum_{i=1}^{N} b_{i,j}\left(1 - \frac{(Ncs_{i,j}(m)+1)}{Nc+1}\right) - \sum_{i=1}^{N} d_{i,j}\left(1 - \frac{Ncs_{i,j}c(nm)+1}{Nc+1}\right)$$

Where, referring to Table 1 as a guide:

Case 1: Both concepts or expressions are equal when; all defining semantics and content are equivalent. For example, Vehicle Broken is equivalent to Engine Broken:

Vehicle Broken
   HasLocation Engine
   HasSite Spark-Plug

And

Engine Broken
   HasLocation Engine
   HasSite Spark-Plug

Case 2: The two concepts, i and j, differ in their definitions by some features or attributes and the Z-Equation defines their similarity:

$$z(i, j) = 1 - \sum_{i,j=1}^{N} a_{i,j}\left(1 - \frac{Ncs_{i,j}c(m) + 1}{Nc + 1}\right) +$$

$$\sum_{i=1}^{N} b_{i,j}\left(1 - \frac{Ncs_{i,j}(m) + 1}{Nc + 1}\right) -$$

$$\sum_{i=1}^{N} d_{i,j}\left(1 - \frac{(Ncs_{i,j}c(\text{nm}) + 1)}{Nc + 1}\right)$$

The Feature Measure ($F_m$) between given concepts, C1 and C2 with their AVPs, is defined using the Z-Equation as:

$F_m(C1,C2)=1/Z$

When the components of the Z-Equation (e.g. Nc=0) are zero, then the value of $F_m$ is 1, meaning that the concept itself is its own feature.
Where:
$Ncs_{i,j}c(m)$=The number of concepts that have matching AVPs with concepts i and j (e.g. HasLocation Engine is a feature that matches two concepts Vehicle Broken and Engine Broken)
Nc=The total number of defined concepts
$Ncs_{i,j}$=The number of concepts that have AVPs with matching relations but different values to concepts i and j (e.g. HasLocation Engine with HasLocation Car).
$Ncs_{i,j}c(\text{nm})$=The number of AVPs that did not match between the two concepts i and j.
For example, Table 1 could be extended with additional modifiers: Acute Engine Broken, concept C1, and Engine Broken, concept C2. These two concepts can be compared based upon their AVPs. C1 and C2 both contain AVP1 and AVP2 but only C2 contains AVP3, the "HasModifier Acute" portion of the definition, for example:
Engine Broken
   HasLocation Engine
   HasSite Spark-Plug
And
Acute Engine Broken
   HasLocation Engine
   HasSite Spark-Plug
   HasModifier Acute The "HasModifier Acute" portion of the definition is a non-match between these two concepts and represents the sole point of difference between them. The degree to which these two concepts differ is described in the Z-Equation.

Variables a, b, and d are weightings of the importance or contribution of different semantics to overall meaning. These weights can be empirically derived by experts in the field (perhaps by a consensus process within an area of specialization) or by statistical or other computing methods. The variables are defined as follows:
$a_j$=Is the weighting for the complete matches for the $j^{th}$ feature (meaning a defining feature of a concept linked to the concept being defined). For each such type of shared defining feature, each feature would have same weight throughout the terminology.
$b_j$=Is the weighting for the relation matches only (where the relationship but not the concept instantiated with that relationship matches between the two concepts for which the distance is being measured) for the $j^{th}$ definition (meaning a defining relation of a concept linked to a concept being defined). For example. "HasLocation Engine" and "HasLocation Car" share the relationship "HasLocation".
$d_j$=Is the weighting for the non-matches for the $j^{th}$ feature (meaning a defining feature of a concept linked to the concept being defined but that does not match between the two otherwise related concepts). For example in comparing Acute Engine Failure with Engine Failure, the difference is the "HasModifier Acute" to the definition of the former concept thereby increasing the distance between these entities. For each such type of shared defining feature it is defined to have the same weight throughout the ontology.
The Z-Equation can be rewritten as follows:

$$\alpha = \sum_{j=1}^{N} \alpha_j\left(1 - (N_{cs_j}c(m) + 1)/(N_c + 1)\right)$$

$$\beta = \sum_{j=1}^{N} b_j\left(1 - (N_{cs_j}(m) + 1)/(N_c + 1)\right)$$

$$\delta = \sum_{j=1}^{N} d_j\left(1 - (N_{cs_j}c(\text{nm}) + 1)/(N_c) + 1\right)$$

Then, for any smooth, continuous, differentiable Rvachev-functions, $R_1$, $R_2$, and $R_3$, for the attributes $A_i$, ..., $A_n$, $B_1$, ..., $B_n$, $D_i$, ..., $D_n$, for features, relations and inter-conceptual differences, the embedded form of the Z-Equation becomes the Rvachev-function Feature-Measure, f ($R_{Concept(n)}$), defined as:

$f(R_{Concept(n)})=1-f(\alpha,A)\cdot R_1+f(\beta,B)\cdot R_2+f(\delta,D)\cdot R_3$ The Composite Normalized Relativistic Distance using Rvachev-functions of distance is defined where "R" signifies the Rvachev-function form of the concept:

$$F(R_{Concept(1)}, R_{Concept(2)}) = \frac{\int E(f(R_{Concept(1)}) - f(R_{Concept(2)})).dx}{\int \max(R_{Concept(1)}, R_{Concept(2)}).dx}$$

Relative Distance: $D(\text{Concept}(1),\text{Concept}(2))=1-F(R_{Concept(1)},R_{Concept(2)})$ This allows us to decouple the attributes name-space (e.g., HasBehavior) from the features and to have a model where our Rvachev-functions look like FIG. 4. Each point of the semantic space can be mapped to an attribute value pair (for example, a feature vector).

Values with different domains can be represented. Values defined at each point of the semantic space of an entity (example, Engine) can have values global to all points of the entities (e.g. fuel gauge reading), whereas others are defined as relational values to features of the AVP of interest (e.g. "modifier Acute"). FIG. 4 shows that two-different sets of Rvachev-functions are needed (that can be measured with the normalizing distance metric integral):
  (1) One set of Rvachev-functions for the concepts, 22 and 23 of the Attribute-Value pair (AVP).
  (2) One set of Rvachev-functions for the Attribute Value Pairs (AVPs), 29 and 27 that may share some attributes, as intersection region 28. This set of Rvachev-functions assigns topologies of AVPs embedded within the sub-spaces and this permits "blends" between AVPs shared by different concept entities.
In general, the simplest form of the relative distance between concepts, 22 and 23, respectively C1 and C2 represented by Rvachev-functions is derivable from the preceding explanations by those skilled in the art as:

$$D(R_{c1}, R_{c2}) = 1 - R_s$$

Distance between the composite concepts Concept C1 and Concept C2 in discrete form can be given using summation notation as:

$$D(C1, C2) = \left[ \sum_{a=1}^{P_{1m}} \sum_{b=1}^{P_{2m}} \min(D(R_{P1}c_a, R_{P2}c_b))^2 \right]^{1/2}$$

Where:
$P1_m$, $P2_m$ are the number of concepts defining Concept 1 and Concept 2 respectively $R_{G1}c_a$, $R_{G2}c_b$ are the Rvachev-functions associated with specific concepts defining Concept 1 and 2. The examples from using FIG. 5 and Table 4 are:
$R1:\omega_1$, $R2:\omega_2$, $R3:\omega_3$ The functions can be any AVP or attribute classifying function that can be logically tested (for truth) and the Rvachev-functions define the sub-space of the semantic entity. The Rvachev-functions themselves compose and are made up of (a functionally related group of components forming or regarded as a collective entity) individual primitives, as shown in FIG. 5, the Rvachev-functions 37, 38, 39, and 40 compose the composite distance field, another Rvachev-function, 41, CDF(C1,C2).

6. Order Structure

The adjacency of concepts at any given level are ordered by relative distances which means that while concepts are all very similar at a level, they are distinct and this distinctness is measured in the present invention with respect to their relative normalized common feature sets: in summary, each concept in a space has three components being:
(a) attitude;
(b) orientation; and,
(c) magnitude.

The attitude is how the concept is situated in the surrounding space, the orientation is the directionality of it's signed distance field, and the stance is its measure. Between hierarchies at a given level, concept clusters (siblings) may be opposites (i.e. be antonyms to each other) or be different kinds of variants or have no relationships if their immediate parents are unrelated by having no common shared information.

In order to render the order structure into a numerical factor, the concept is represented as a oriented area by assigning to each point of the affine distance field generated by the Rvachev Function representing that concept's attribute and feature structure, a vector valued function at every point $P_i$ of the conceptual space the distance field representation (defining that conceptual entity implicitly) as a function $P_i(p)$, i=1, 2, ..., m of the properties (from a finite set of properties or primitives) that constitute the concept. In other words, the method for generating order factors is to construct a vector valued conceptual function with the constraint that its scalar components must form a partition of unity: Each conceptual function $P_i(p)$ must interpolate the individual component functions $P_j$=1, 2, ... n associated with n conceptual properties (modeled via distance) or features of the concept using some weight functions $W_i$. Assume one has such functions, f and g that expresses, as in FIG. 7, that wild-dogs are dogs and vice-versa but that as the value of attributes for "wildness" is transfinitely interpolated between the two kinds of dogs, represented here in generic form as c1 and c2:

Let the relative context weighting function between two concepts, $Wt_{12}$:
from c1 to c2 be:

$$Wt_{12} = W(\tilde{\omega}, f(c1, c2))$$

and, from c2 to c1 be, $Wt_{21}$:

$$Wt_{21} = W(\tilde{\omega}, g(c2, c1))$$

Therefore the average normal weight contribution=$(Wt_{12} + Wt_{21})/2$

When $S_i$ themselves are sets of points which have different "interpretations" such as for example, referring to FIG. 6, the case where 44, animal like 48, dog and 49, wild-dog when considered within the context of being 46, Pet, dogs are pets while 47, 49 wild-dogs are not because they are 47, wild.

The interpolation functions that map between the sets of $S_i$ (which the distance functions $\sigma_i(p_i)$ represent for each of the points sets, $S_i$) are called transfinite interpolations. It is these higher order functions that provide the in-context measure of semantic distances. Referring to FIG. 7, point, p, represents "dog" and point "q" represents "wild-dogs", and one wishes to say that while both dogs and wild-dogs are animals, only dogs are pets, then, a function is assigned such that $W_p=1$ for dogs as pet and $W_q=0$ for wild-dogs as pet, so that it is in fact the case that there is a parameter, u, that varies from "pet" likeness over wild-dogs and dog such that the weight becomes a "bias" on the actual distance function that represents bear as animal and dog as animal, per the technique of Shepherd interpolation. The way this can be done is to use a weight function such the weight for pet over dog is 1 and the weight for pet over bear is 0 (or whatever low number represents the odd person in the world who wants a pet bear).

Therefore, Let: $W_p = W((\tilde{\omega}_p))$; $W_q W(\tilde{\omega}_q)$; where $\tilde{\omega}$ is a parametric function on the weighting specific to each point, p as dogs and q as wild-dogs.

Therefore, the weight function, W for the i-th feature of the type $\tau$ must vary between 0 and identity: $0 < W^\tau_i(p) < 1$. Therefore, each weight function controls the influence of the membership type function associated with feature set Si (of features $F_i$). Referring to FIG. 7, In this way, 72 dogs can be closer to be 69 pets, than 67 animals, 73 wild-dogs. This will allow the same concepts to be used with multiple functions for multiple domains of application, supporting the re-use and extensibility of the present invention.

The composition of a novel concept is represented by the composition from m different other conceptual features as per FIG. 5, and the composite distance fields can correspond to regions, as per FIG. 7, with respect to ontology as in FIG. 6. The fraction of each concept at every point P of the space of representation of the new term is represented by a scalar conceptual feature function $P^{i,j}(p)$, j=1, 2, ..., m are features and i are the points such that properties can be graded and have transitional regions, such as 71 in FIG. 7, between 72, dog and 73 wild-dog. In other words, the present invention uses a potential function to construct a vector-valued function representing the features of a concept of interest with the constraint that its scalar components must form a partition of unity.

In summary and referring to FIG. 7, each conceptual function $P^{i,j}(p)$ must interpolate the individual component functions $P^j=1, 2, \ldots$ m associated with m conceptual properties (modeled via distance) or features of the new term using some weight functions The methods of (1) through (6) using the fundamental factors per Table 2 will work for any taxonomic hierarchy or network of concepts that have common intermediate parents and measurable attributes (from probabilistic, statistical, Bayesian or evidential or ad-hoc confidence measures) and each contributing factor is simply added into the conceptual equation to provide the following final form of the equation for Conceptual Relativity Distance:

$$f(C1, C2) = e^{-([D_{c1}/D_{c2}]*[Level_{C1}/Level_{C2}])*\left(\left[\frac{\int E(f(LDF(C1)\cdot R_{C1})-f(LDF(C2)\cdot R_{C2}))dx}{\int max(R_{C1}, R_{C2})dx}\right]-1\right)*\left(\frac{\Omega_{C1}(C1)}{\Omega_{C2}(C2)}\right)}$$

where $\Omega_{C1}$ is the unsigned area of the Rvachev-function defining C1 and $\Omega_{C2}$ is the unsigned area of the Rvachev-function defining C2, where $R_{C1}$ and $R_{C2}$ are the Rvachev-functions for C1 and C2 as described in the Fundamental Factors 1 through 6 in the preceding. Note that, in the equation the Top, the density, or $\Omega_{TOP}$ is 0 and the $\Omega_{BOTTOM}$ is 1.0.

In general, there are several different distance field types than can be created if a vector-valued function is assigned to each point of the distance field. Referring to FIG. 8, the following types are defined: 75 shows a pair of distance fields whose orientations do not align but whose intersections sum while 76 illustrates the case that the fields are incommensurate and that they cancel and result in a null intersection. The field pair 77 shows the case where the fields sum and that they are oriented together, while 78 shows a vector flow with a reinforcement of the intersecting fields. 79 shows the case where there is no change to the value of the intersection, neither increase nor decrease and 80 shows the case where the fields cancel in superposition. 81 shows the geometry required to represent 3 conceptual regions and their logic, following Venn-Diagrams while 82 shows a change in geometry is needed for 4 conceptual regions to represent Venn-Diagramming logic in a field, and in general geometries are different depending on the numbers of conceptual regions, but the logic remains the same and corresponds to three valued logics where boundaries are indeterminate.

Algorithm and Method for Computing Relative Conceptual Distances for Search

Referring to FIG. 9, FIG. 2 and FIG. 3: when the ontology exists or is induced, then relative conceptual distance calculations can be computed using the following overall steps:
1. Compute Parent to Child inter-concept distances using the general conceptual relativity general form following the example computation in Listing 1.
2. Store the all distances and vectors in a Multi-Vantage point Tree or other spatial data structure after following the steps in FIG. 9, where the vector-valued function can be assigned unit-vectors if simplicity is needed.
3. Formulate any query as per the method of FIG. 5 by composing the concepts into a composite Rvachev-function.
4. Using the equation returned from step 3, compute the value as FIG. 9, 90, and use this value as the distance metric to search in the spatial data structure (e.g. The Multi-Vantage Point Tree) in FIG. 9, step 91 using Multi-Vantage Point Tree well known search techniques.
5. Return results.

In detailed form, the complete algorithmic steps are as follows referring to FIG. 9:
1) Given an input which is Ontology, 83, as a directed hierarchical concept network;
2) Assign Rvachev-functions, 84, uniquely to each top primitive attribute or concept;
3) Optionally add vector valued functions, 85, or set these to unity and compose composite Rvachev-functions, complex top level composite concepts ensuring that each share attributes, and weighted, 87, to yield 86, C1 and 88, C2:
   a. If concepts share the same Rvachev-function, then add weightings, 87
   b. Have an contextual distance interpolation, 89, scalar value that varies independently each weighting 87
   c. for C1 and C2 based on transfinite interpolation scheme as discussed in this invention, write the composite field 90
4) For each distance field as given by the Rvachev-function, 84 embed a vector valued potential field function that is not unity, 85, to provide orientation to the concepts, where C1 and C2 that may have different orientations (i.e. signs) depending if they are covariant (similar or synonymous) or contravariant (dissimilar or antonymous) if they share the same Rvachev-functions and cannot otherwise be distinguished by, 84.
5) Using steps 3 and 4, compose the composite Rvachev-function vector field;
6) Using 4, and knowledge from 3(b) compose a transfinite vector valued interpolation
7) If a domain ontology exists for the top ontology, repeat the process of (steps) 1 through 6 and, compute the conceptual relativity factors of the top, through domain'
8) Compute the composite equation that defines concepts based on the Conceptual Relativity Distance exponential in step 90;
9) Compose the set of equations from 90 into single Rvachev-function in exponential form of the relative conceptual distance by substitution; and
10) Return the results as vectors to identify all concept centroids and their distance field functions in a spatial data store such as a Multi-Vantage Point Tree in 91 in which nodes store the equations and the vectors create the vantage points, or other similar spatial storage structure.

The core advantage is being able to represent concepts with continually varying conceptual properties in terms of a field-structure (like a patterned gravity field or electromagnetic field) and to create functionally graded conceptual data filtering with various semantic matching controls using continuous thresholds or control parameters, for example to quantify concept cluster drift or evolution over time. In this type of system, computations are continuous and reasoning occurs as field processes and that this is suitable for implementation on digital or analog or Quantum computers. A model of the spatio-temporal behavior of distributed dynamical properties based on a field model is significantly different from the traditional object-based models normally used in pattern-recognition or concept representation models since the field model treats features as continuous entities instead of as attributes of discrete objects. This new invention provides integrated dynamic conceptual distance computation and modeling of concepts with continuously varying heterogeneous properties.

The field model proposes a representation based on a static (distance/topology) and a dynamic (vector-valued) aspect to representation:
  (a) The static model describes the distribution of each feature as a quantitative distance field with semantic significance. Composite fields are constructed from intersection models of pairs of fields; and,
  (b) The dynamic model describes processes acting on the fields, and qualitative relationships between parameters. Spatio-temporal behavior occurs through interacting temporal processes, influencing points in space, and changing the topology or geometry.

The immediate consequence of (a) is that patterns in the field themselves have a representation as field elements and are, therefore, continuously variable. The differential equations describing causal processes that in turn define the changes in relations between the concepts (as represented in the field) can together represent the patterns of dynamical semantics of conceptual change or shift.

Algorithm and Method for Generating an Order Structure

Referring to FIG. 10, for this worked out algorithmic solution, there is defined Q corresponding to 92, a field constant (weighting) that is unique to each type of ontologically relevant concept generating the virtualized gravity field, however, it should be noted that the values produced by the conceptual relativity method will in practice be used. Vector valued functions can be potential or gravitational functions and added to the Rvachev-functions generate the distance fields that are vector fields, which act like moving-energy surfaces where concepts act like virtual particles, 93, play the role of potential-wells. In particular, in order to generate ontology from data points with feature sets, the foregoing representations of concepts are required in the form of vector distance fields. In the case that no prior ontology exists, the ontology can be induced by application of the Rvachev-functions and a suitable vector valued function to induce an ordering or ranking bby annealing the field through iterative computations such that paths 95 cluster the virtual particle data in the field, 96 of FIG. 10. The purpose here is to simplify and explain the method without undue complexity in writing lengthy symbolic or algorithm steps. Referring to FIG. 10, which represents steps of computing the Semantic Distance Fields from data to cluster concepts, let the field potential function representing the virtual particles 93 be:

$$U = -Q \cdot Fx \cdot dx$$

where Fx is the force function, dx is the distance function and Q is the field constant for a particular type (or the superposition thereof). Let Y be the matrix of N concepts of m-dimensional data points where one would examine the field. Let X be the matrix of n training data from a source—these are the training field sources. The task is to obtain the matrix D of all the distances between concepts and training data. This is the machine learning stage. The matrix D is computed as follows:

$$D = Y \otimes Y * 1^{[1 \times N]} - 2 * Y * X + 1^{[N \times 1]} * X \otimes X$$

The "circled-x" operator (i.e. the crossed-circle) denotes the scalar product multiplication of pair-wise elements of the matrices (this stems from a definition of scalar multiplication between blades of a Geometric Algebra) while the asterisk is the contraction product from Geometric Algebra; The matrix of size M by N elements all equal to 1 is given by the notation $1^{[M \times N]}$; Given the distance matrix D all the properties of the field can be obtained by simple algebra performed on D. Using a small epsilon instead of zero eliminates contraction by zero and numerical problems of division by zero. Given the concept field, the data filtering process is reduced to gradient descent. The process begins starting from the position of a new data point to be filtered. In terms of qualitative symbolic semantics one can ignore values or magnitudes and use just the signature of the orientations, while appending a list of labels of nearby concepts. The signature of the orientations is called a spatial signature that describes the oriented dynamics (i.e. where to, or how to, move).

The sample to be classified is shifted along the vector field gradient direction (orientation in a n-space) by a step amount d and the whole field is recalculated again in the new position, producing a path, 98. This procedure is repeated until the unlabelled datum approaches any concept source at the distance lower or equal than d, as given by 99 and 97 respectively for data "a" and "b,c,d". If this happens the sample is labeled according to the features of the concept sources it was intercepted by en-route. Referring to FIG. 10, the last concept encountered is the top-category since it will have the shortest Semantic Distance since an unlabelled datum will have arrived in proximity by the iterative process, and the set of shortest distances with a suitably chosen threshold for clustering will produce a partitioning by a chosen path, 98, such that data from 99 and 97 are partitioned from the path, re-described as 101, to data serving the role of ontological elements, 102, 103, 104, and 105 respectively. By assembling the concepts thus collected the ontology or taxonomy is induced.

The magnitude of d, corresponds to a quantized length of a positional "jump" causes different relative shifts for differently scaled dimensions (according to the different scaling of the types of relations that would determine the field structure). In order to overcome this, one can use an orientation vector, O, that keeps d within a normalized dimension where it can be applied within the scaling of that dimension and separate from all other dimensions that may scale differently.

For normalized fields, the input space is normalized to cover all the training data within the range (0,1) in all dimensions and set the step d to the fixed value: epsilon. During the learning process the new data is transformed to the normalized input space and even if its position falls outside the range (0,1) in any dimension, the step d remains still well scaled. The step d has been deliberately denoted by the same symbol as lower limit of the distance length differential. Given distance matrix D calculated as before, the matrix of forces F can be immediately obtained.

Exploiting the triangular relation between forces and shifts and given constant d the matrix of shifts, S, can be calculated which provides fast convergence of the field:

Algorithm for Computing the Semantic Distance Field for Clustering $$S = d * F / [(F \otimes F) * 1^{[N \times 1]} * 1^{[1 \times N]}]$$

1. Given a concept set X and unlabeled testing data Y to be classified, calculate the matrix of Semantic Distances D.
2. Calculate the matrix of field forces at the positions of unlabeled datum to be classified.
3. Given a fixed step, d, calculate the shifts of the datum samples and iterate them to the new positions;
4. For each sample, if the distance to any concept source is less or equal to the step epsilon, the threshold of the smallest step, then classify these data with the labels found from the sources intersected in the neighborhood, and remove these datums from the matrix Y.

5. If matrix Y is empty, terminate else iterate from step 1.
6. Stop if matrix Y is empty and return the partitions The data transduction as presented above, is equivalent to a digitized sampling of semantic information at a resolution of epsilon and leads to the split of the whole input space into the subspaces labeled according to the labels of field sources capturing the data from these subspaces. Semantic aliasing in the form of misclassifications can occur, however, using ontologies and rules, semantic-anti-aliasing can also be accomplished. If the field potential is defined to be very strong locally, the decision boundaries from such semantic field data filter should converge to the Voronoi diagram reflecting a nearest neighbor rule. The algorithm for computing the signed, oriented critical points which correspond the critical conceptual entities in the field, and from this, that the Morse-Graph is produced that represents the concept network based on the input data, the following algorithm is applied:

Algorithm to Induce Ontology from Data Clustering by Semantic Distance Fields:
1. Sample the field at regular intervals
2. At each interval point, compute the Pseudoscalar (for example within a tiny bounding box at the point) which is the geometric outer product of the vector components of the field.
3. IF there is a singularity, then the value of the Pseudoscalar will be the positive hypervolume
4. IF there is NO singularity, then each term of the Pseudoscalar will appear twice, once positive and once negative, and will cancel to a zero hypervolume
5. Repeat until all singularities are found and assign these as starting positions to agents.
6. Compute the minimum distances between all critical points and their neighbors and find the minimum length path using a threshold to group elements within a radius;
7. Assign the chain of minimal length paths to the chain of levels of an ontology.
8. Elements within the same distance within threshold form the siblings;
9. Repeat the process until no further unassigned elements exist;
10. Return the ontology For those skilled in the art, it is clear that the geometric algebra will have produce the critical points of any vector field by computing singularities using the pseudoscalar computation. Furthermore, it can be seen that the vector equations can all be rewritten using the Rvachev-function form in which the Rvachev-function provides the distance-field and where the vector-valued potential function provides the directionality and magnitude to each point of the distance field.

Referring to FIG. 11, the master process for using the conceptual relativity semantic distance field method, is provided. A terminology, 106 corresponding to ontology with a top and domain, uses the methods of FIG. 5 where a primitive set of Rvachev-functions, for example but not limited to Table 3, 108 is combined with Rvachev-functions 107 to produce distance fields, 111. The ontology is used to compute the hierarchical distance exponential, as per Listing 1, 109, to which fundamental weighting factors are added as per Table 2, 110 and combined with 111 into a representation 112 that uses transfinite interpolation functions that combines with weighting corresponding producing a set of overlapping distance fields, analogous to FIG. 7, but, compromising any of the relations as per FIG. 8, 114 to produce a composite field 113 to which vector valued functions 115 are assigned, as per the algorithms referring to FIG. 10, that allows for the computation of field evolution, 116. The final stable vectors of the field are stored in a spatial store, 117.

Features of the invention, including the various algorithms described in detail above, are implemented using some form of computer microprocessor. As one of ordinary skill in the art would recognize, the computer microprocessor or processor can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the computer processor may execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OSX and other operating systems known to those skilled in the art.

In addition, the invention can be implemented using a computer based system 1000. The computer 1000 includes a bus B or other communication mechanism for communicating information, and a processor/CPU 1004 coupled with the bus B for processing the information. The computer 1000 also includes a main memory/memory unit 1003, such as a random access memory (RAM) or other dynamic storage device (e.g., dynamic RAM (DRAM), static RAM (SRAM), and synchronous DRAM (SDRAM)), coupled to the bus B for storing information and instructions to be executed by processor/CPU 1004. In addition, the memory unit 1003 may be used for storing temporary variables or other intermediate information during the execution of instructions by the CPU 1004. The computer 1000 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 1004.

The computer 1000 may also include a disk controller coupled to the bus B to control one or more storage devices for storing information and instructions, such as mass storage 1002, and drive device 1006 (e.g., floppy disk drive, read-only compact disc drive, read/write compact disc drive, compact disc jukebox, tape drive, and removable magneto-optical drive). The storage devices may be added to the computer 1000 using an appropriate device interface (e.g., small computer system interface (SCSI), integrated device electronics (IDE), enhanced-IDE (E-IDE), direct memory access (DMA), or ultra-DMA).

The computer 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer 1000 may also include a display controller coupled to the bus B to control a display, such as a cathode ray tube (CRT), for displaying information to a computer user. The computer system includes input devices, such as a keyboard and a pointing device, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or Conceptrated by the computer system.

The computer 1000 performs at least a portion of the processing steps of the invention in response to the CPU 1004 executing one or more sequences of one or more instructions contained in a memory, such as the memory unit 1003. Such instructions may be read into the memory unit from another computer readable medium, such as the mass storage 1002 or a removable media 1001. One or more processors in a multi-processing arrangement may also be employed to execute the sequences of instructions contained in memory unit 1003. In alternative embodiments, hard-wired circuitry may be used in place of or in combination with software instructions. Thus, embodiments are not limited to any specific combination of hardware circuitry and software.

Figure 12:
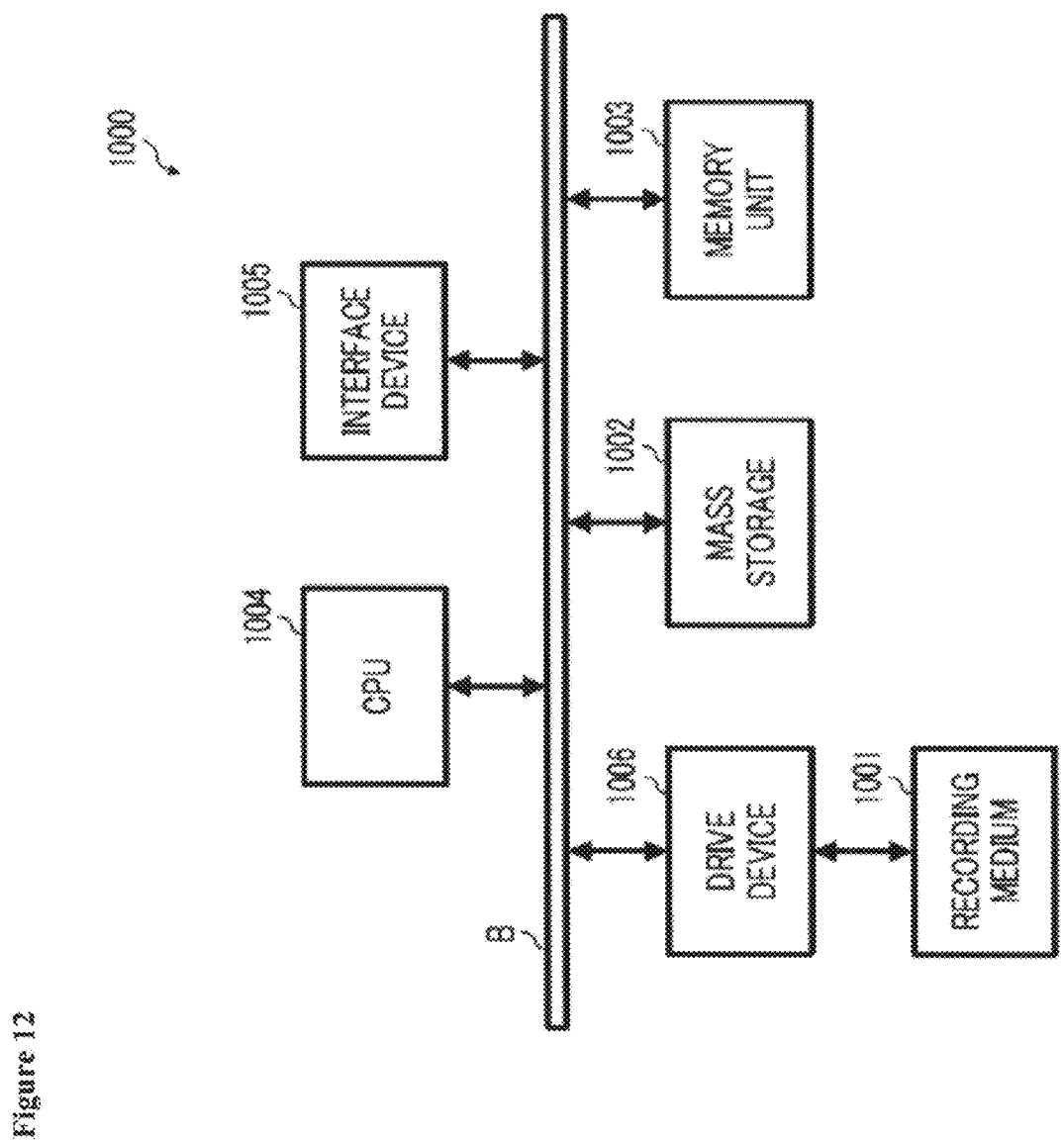
FIG. 12 illustrates a computing device implementing various embodiments.

As stated above and as is shown in FIG. 12, the computer 1000 includes at least one computer readable medium 1001 or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read.

Stored on any one or on a combination of computer readable media, the present invention includes software for controlling the main processing unit, for driving a device or devices for implementing the invention, and for enabling the main processing unit to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code elements on the medium of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the CPU 1004 for execution. A computer readable medium may take many forms, including but not limited to, non-volatile media, and volatile media. Non-volatile media includes, for example, optical, magnetic disks, and magneto-optical disks, such as the mass storage 1002 or the removable media 1001. Volatile media includes dynamic memory, such as the memory unit 1003.

Various forms of computer readable media may be involved in carrying out one or more sequences of one or more instructions to the CPU 1004 for execution. For example, the instructions may initially be carried on a magnetic disk of a remote computer. An input coupled to the bus B can receive the data and place the data on the bus B. The bus B carries the data to the memory unit 1003, from which the CPU 1004 retrieves and executes the instructions. The instructions received by the memory unit 1003 may optionally be stored on mass storage 1002 either before or after execution by the CPU 1004.

The computer 1000 also includes a communication interface 1005 coupled to the bus B. The communication interface 1004 provides a two-way data communication coupling to a network that is connected to, for example, a local area network (LAN), or to another communications network such as the Internet. For example, the communication interface 1005 may be a network interface card to attach to any packet switched LAN. As another example, the communication interface 1005 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1005 sends and receives electrical, electromagnetic or optical signals that carry digital data streams representing various types of information.

The network typically provides data communication through one or more networks to other data devices. For example, the network may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, coaxial cable, optical fiber, etc). Moreover, the network may provide a connection to, and the computer 1000 may be, a mobile device such as a personal digital assistant (PDA) laptop computer, or cellular telephone.

The above noted embodiments can be applied to determining the distance between concepts for search or for classification of objects.

While certain embodiments have been described, these embodiments have been presented by way of example only, and are not intended to limit the scope of the inventions. Indeed the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method of generating, within a framework that represents data as particles in a vector field, an implicit structure to derive conclusions about data having an implicit ontology, the method comprising:
   obtaining the data having the implicit ontology and being represented at a plurality of data points;

representing a superposition of the obtained data by a superposition of multiple fields including vector fields based on solutions of respective distance field functions, the representation of the superposition corresponding to a representation of a superposed state, wherein each data point is represented as a particle in the vector fields and the vector fields include one or more concepts also represented as respective particles;

determining, based on the superposition of the multiple fields, forces at respective data points of the obtained data within the vector fields;

separating the superposed state by shifting each concept of the obtained data along respective directions of the forces and then updating the superposition of the multiple fields based on the evolved data by re-solving the respective distance field functions with the positions of the shifted concepts using a particularly programmed computing device;

for a data point of the data points,
repeating the separating step until the data point is shifted along the forces and converges to a stable point based on a pre-defined threshold, wherein the repeated shifting generates a path of the data point, and the one of the one or more concepts forms a leaf node in the implicit data structure;

measuring distances between the data point and concepts positioned along the path of the data point within the separated superposed state, and, for concepts within a clustering threshold distance of the path of the data point, linking the leaf node to nodes of the concepts within the clustering threshold distance as to generate the implicit structure as the implicit ontology;

storing said implicit ontology and similarity in a memory; and performing a search of said stored implicit ontology including deriving a similarity of a first piece of the data to a second piece of the data based on the measured relative distances between the first piece and the second piece in the implicit structure.

2. The method according to claim 1, wherein the distance field functions are Rvachev-functions.

3. The method according to claim 1, wherein the data is language data.

4. The method according to claim 1, wherein the particularly programmed computing device includes memory and a microprocessor.

5. The method according to claim 1, wherein the data is medical data.

6. The method according to claim 1, wherein
the relative distances is induced based on setting a fixed distance between a top layer of the implicit ontology and any other layer of the implicit data ontology to a constant value,
the distance between the top layer and a bottom layer of the implicit ontology is set to a first predetermined constant distance, and
a distance between an intermediate layer and the top layer of the implicit ontology is set to a second predetermined constant distance, the first predetermined constant distance being different than the second predetermined constant distance.

7. The method according to claim 6, wherein the first predetermined constant distance is one, and the second predetermined constant distance is zero.

8. A non-transitory computer readable medium having stored thereon a program that when executed by a particularly programmed computing device causes the particularly programmed computing device to execute a method of generating, within a framework that represents data as particles in a vector field, an implicit structure to derive conclusions about data having an implicit ontology, the method comprising:

obtaining the data having the implicit ontology and being represented at a plurality of data points;

representing a superposition of the obtained data by a superposition of multiple fields including vector fields based on solutions of respective distance field functions, the representation of the superposition corresponding to a representation of a superposed state, wherein each data point is represented as a particle in the vector fields and the vector fields include one or more concepts also represented as respective particles;

determining, based on the superposition of the multiple fields, forces at respective data points of the obtained data within the vector fields;

separating the superposed state by shifting each concept of the obtained data along respective directions of the forces and then updating the superposition of the multiple fields based on the evolved data by re-solving the respective distance field functions with the positions of the shifted concepts;

for a data point of the data points,
repeating the separating step until the data point is shifted along the forces and converges to a stable point based on a pre-defined threshold, wherein the repeated shifting generates a path of the data point, and the one of the one or more concepts forms a leaf node in the implicit data structure, measuring distances between the data point and concepts positioned along the path of the data point within the separated superposed state, and, for concepts within a clustering threshold distance of the path of the data point, linking the leaf node to nodes of the concepts within the clustering threshold distance as to generate the implicit structure as the implicit ontology, storing said implicit ontology and similarity in a memory; and performing a search of said stored implicit ontology including deriving a similarity of a first piece of the data to a second piece of the data based on the measured distances between the first piece and the second piece in the implicit structure.

9. The non-transitory computer readable medium according to claim 8, wherein the distance field functions are Rvachev-functions.

10. The non-transitory computer readable medium according to claim 8, wherein the data is language data.

11. The non-transitory computer readable medium according to claim 8, wherein the particularly programmed computing device includes memory and a microprocessor.

12. The non-transitory computer readable medium according to claim 8, wherein the data is medical data.

13. A device for generating, within a framework that represents data as particles in a vector field, an implicit structure to derive conclusions about data having an implicit ontology, the device comprising:

processing circuitry configured to
obtain the data having the implicit ontology and being represented at a plurality of data points;

represent a superposition of the obtained data by a superposition of multiple fields including vector fields based on solutions of respective distance field functions, the representation of the superposition corresponding to a representation of a superposed state, wherein each data point is represented as a particle in the vector fields and the vector fields include one or more concepts also represented as respective particles;

determine, based on the superposition of the multiple fields, forces at respective data points of the obtained data within the vector fields;

separate the superposed state by shifting each concept of the obtained data along respective directions of the forces and then updating the superposition of the multiple fields based on the evolved data by re-solving the respective distance field functions with the positions of the shifted concepts;

for a data point of the data points, repeat the separating step until the data point is shifted along the forces and converges to a stable point based on a pre-defined threshold, wherein the repeated shifting generates a path of the data point, and the one of the one or more concepts forms a leaf node in the implicit data structure, measure distances between the data point and concepts positioned along the path of the data point within the separated superposed state, and, for concepts within a clustering threshold distance of the path of the data point, linking the leaf node to nodes of the concepts within the clustering threshold distance as to generate the implicit structure as the implicit ontology; and store said implicit ontology and similarity in a memory; and perform a search of said stored implicit ontology including deriving a similarity of a first piece of the data to a second piece of the data based on the measured distances between the first piece and the second piece in the implicit structure.

14. The device according to claim 13, wherein the distance field functions are Rvachev-functions.

15. The device according to claim 13, wherein the data is language data.

16. The device according to claim 13, wherein the device further includes memory and a microprocessor.

* * * * *